(12) United States Patent
Flam

(10) Patent No.: US 7,703,021 B1
(45) Date of Patent: Apr. 20, 2010

(54) DEFINING USER ACCESS IN HIGHLY-CONFIGURABLE SYSTEMS

(75) Inventor: Ran J. Flam, Port Monmouth, NJ (US)

(73) Assignee: Sparta Systems, Inc., Holmdel, NJ (US)

(*) Notice: Subject to any disclaimer, the term of this patent is extended or adjusted under 35 U.S.C. 154(b) by 1030 days.

(21) Appl. No.: 10/444,323

(22) Filed: May 23, 2003

Related U.S. Application Data

(63) Continuation-in-part of application No. 10/246,907, filed on Sep. 19, 2002.

(60) Provisional application No. 60/383,095, filed on May 24, 2002, provisional application No. 60/386,158, filed on Jun. 5, 2002.

(51) Int. Cl.
*G06F 3/00* (2006.01)

(52) U.S. Cl. .................. 715/741; 715/743; 715/745

(58) Field of Classification Search ............... 715/738, 715/740–745; 707/9; 709/223–225
See application file for complete search history.

(56) References Cited

U.S. PATENT DOCUMENTS

| | | | | |
|---|---|---|---|---|
| 6,038,563 | A * | 3/2000 | Bapat et al. ............. | 707/10 |
| 6,202,066 | B1 * | 3/2001 | Barkley et al. ........... | 707/9 |
| 6,253,203 | B1 * | 6/2001 | O'Flaherty et al. ....... | 707/9 |
| 6,944,777 | B1 * | 9/2005 | Belani et al. ............ | 713/150 |
| 7,062,532 | B1 * | 6/2006 | Sweat et al. ............. | 709/205 |
| 7,124,192 | B2 * | 10/2006 | High et al. .............. | 709/229 |

OTHER PUBLICATIONS

Sparta Systems, Inc. TrackWise 5.5 Release Notes, 1995-2000, (pp. 9).
Sparta Systems, Inc. "TrackWise User's Guide", 1995-2000, (pp. 179).

* cited by examiner

*Primary Examiner*—Weilun Lo
*Assistant Examiner*—Truc T Chuong
(74) *Attorney, Agent, or Firm*—Patent GC LLC; Gordon E. Nelson

(57) ABSTRACT

A highly-configurable process control system that uses process records in a database system to track a process. The database system relates process records, users, and projects. User permissions to view the process records include permissions for all process records related to a project to which the user is related, all such records that the user has created, all such records that a group the user belongs to have created, all such records that have been assigned to the user, and all such records that belong to an entity to which the user is related.

The process records further include user-configurable fields. User permissions for the fields are provided according to group types which are related to groups to which the users belong. Included are permissions for inserting and deleting values in the user-configurable fields which are separate from the permission to edit the values.

7 Claims, 21 Drawing Sheets

Group Permissions    DB: TRWISE

Group Category: Nonconformance-Full Permission

Overall Permissions
- ☑ Can Open
- ☐ Can Re-Open
- ☑ Can Create Children
- ☑ Can Assign/Reassign
- ☑ Can Post Activities 1005
1011

Field Permissions
Sorted by: Field Type (Asc)

| Name 1007 | 1009 Field Type | Can Edit | Can View |
|---|---|---|---|
| QA Approval By | Person | ☐ | ☐ |
| Person Notified  1006 | Person | ☑ | ☑ |
| Analyst Approval By | Person | ☐ | ☐ |
| Contact | Person | ☑ | ☑ |
| 2nd Auditor | Person | ☐ | ☐ |
| Condition | Selection | ☐ | ☐ |
| Priority | Selection | ☑ | ☑ |
| Final Disposition | Selection | ☑ | ☑ |
| Phase | Selection | ☐ | ☐ |
| Product Family | Selection | ☑ | ☑ |
| Governing SOP | Selection | ☑ | ☑ |
| Proposed Disposition | Selection | ☑ | ☑ |
| Disposition of Samples | Selection | ☐ | ☐ |
| Mfg Stage | Selection | ☐ | ☐ |
| Division | Selection | ☑ | ☑ |

1003

EDIT Mode: Enter your Changes and <Save> when Done.

| Name 1105 | ConfigForm Filename 1107 |
|---|---|
| Audits-Full Permission | audits.html |
| Audits-View Only | audits.html |
| Certificate of Analysis | coa.html |
| Change Control-Full Permission | change_control.html |
| Change Control-View Only | change_control.html |
| Commitment-Full Permission | commitments.html |
| Complaints-Full Permission | complaints.html |
| Complaints-View Only | complaints-view.html |
| Corrective Action-Full Permission | corrective_action.html |
| Correspondence-Full Permission | regulatory.html |
| Environmental-Full Permission | Environmental-FP.html |
| Inquiry-Full Permission | Inquiry-FP.html |
| Nonconformance-Full Permission | Nonconformance-FP-form.html |
| Nonconformance-Partial Permissions | Nonconformance-PP-form.html |
| Observations-Full Permission | observations.html |
| Observations-View Only | Observation-View.html |
| Out Of Spec-Full Permission | Out Of Spec-Full Permission.html |

```
<!--TrackWiseConfigForms-->
<!--Header-->
<table border="0" cellspacing="0" cellpadding="2" width="90%">
    <tr>
        <td colspan="4" align="center" bgcolor="gray"><font
color="white"><!--FormTitle-->CAPA <!--/FormTitle--></font></td>
    </tr>
<!--/Header-->

<tr>
<td colspan="4" align="center">
<table border="0" cellspacing="0" cellpadding="2" class="borderPanel"><!--
BeginRows-->

<!--Row(0)--><tr>

<!--Cell(0)--><td align="right" valign="middle" width="20%"
nowrap><!--Field--> <!--/Field--></td>
        <td align="left" valign="middle" width="30%"
nowrap> </td><!--/Cell(0)-->

<!--Cell(1)--><td align="right" valign="middle" width="20%"
nowrap><!--Field--> <!--/Field--></td>
        <td align="left" valign="middle" width="30%"
nowrap> </td><!--/Cell(1)-->

</tr><!--/Row(0)-->
    <!--Row(1)--><tr>

<!--Cell(0)--><td align="right" valign="middle" width="25%"
nowrap><!--Field--><%0%></td>
        <td colspan="3" align="left" valign="middle" width="75%"
nowrap><%df0%></td><!--/Field--><!--/Cell(0)--><!--/Row(1)-->
    <!--Row(2)--><tr>

<!--Cell(0)--><td align="right" valign="middle" width="20%"
nowrap><!--Field--><%1%><!--/Field--></td>
        <td align="left" valign="middle" width="30%" nowrap><%df1%></
td><!--/Cell(0)-->

<!--Cell(1)--><td align="right" valign="middle" width="20%"
nowrap><!--Field--><%3%><!--/Field--></td>
        <td align="left" valign="middle" width="30%" nowrap>
<%df3%></td><!--/Cell(1)-->
    </tr><!--/Row(2)-->
```

```
<!--Cell(0)--><td align="right" valign="middle" width="25%"
nowrap><!--Field--><%0%></td>
        <td colspan="3" align="left" valign="middle" width="75%"
nowrap><%df0%></td><!--/Field--><!--/Cell(0)--><!--/Row(1)-->
```

1607(1,0)

(form template interpreter 820)

1703

```
<!--Cell(0)--><td align="right" valign="middle" width="25%"
nowrap><!--Field--><b>Short Desc.</b>: </td>
        <td colspan="3" align="left" valign="middle" width="75%"
nowrap>
              1707          1709          1711
1713   <input type="text" name="Short Desc." value=""
onChange="fieldChanged(this)" maxlength="80">

1715  <a href="javascript:spellCheck('Short Desc.')"><img src="images/
          spellcheck.gif" border="0"></a>

</td><!--/Field--><!--/Cell(0)-->
```

1701(1,0)

1705 (brace covering input and anchor lines)

DEFINING USER ACCESS IN HIGHLY-CONFIGURABLE SYSTEMS

CROSS REFERENCES TO RELATED APPLICATIONS

The present patent application claims priority from U.S. provisional patent application 60/383,095, Ran J. Flam, Can Insert and Can Delete field permissions, filed May 24, 2002 and from U.S. provisional patent application 60/386,158, Ran J. Flam, New user access privileges for process records, filed Jun. 5, 2002. The present patent application is further a continuation-in-part of U.S. Ser. No. 10/246,907, Ran J. Flam, et al., Techniques for defining context-sensitive user interfaces in highly-configurable systems, filed Sep. 19, 2002. The process control system that the techniques of the present patent application are implemented in is described in detail in U.S. Ser. No. 10/117,387, Ran J. Flam, Automated process control with user-configurable states that change upon completion of a user-configurable set of activities, filed Apr. 5, 2002. U.S. Ser. No. 10/117,387 and U.S. Ser. No. 10/246,907 are hereby incorporated by reference into the present patent application for all purposes. U.S. Ser. No. 10/117,387, U.S. Ser. No. 10/246,907, and the present patent application have a common assignee. The present application contains the complete Detailed Description and Drawing of U.S. Ser. No. 10/246,907; the material that is added to the Detailed Description in this CIP begins with the section titled New user access permissions.

BACKGROUND OF THE INVENTION

1. Field of the Invention

The invention relates generally to techniques for controlling access to components of a highly-configurable system for controlling processes.

2. Description of Related Art

Whenever data is shared by a number of users of a system implemented by programming a computer, provision must be made for limiting access by the users to the data. That is generally done by defining permissions indicating how an item of data may be accessed and giving a user only those permissions that are required for his or her function. For example, in a file system, the classic permissions are read, write, and execute. read permits the user to read the file, write to modify the file, and if the file is a program file, execute permits the user to execute the file. A particular user may have any combination of the permissions with regard to a particular file. Thus, the author of a program may have read, write, and execute permissions with regard to the program file, while a user of the program may have only the execute permission.

In the configurable process control system described in the parent of the present patent application, part of what could be configured was permissions. The mechanism for doing so was to relate users of the system to projects and to relate each member of a project to a group within the project. Each group had a group category which determined the permissions for the members of the group. There were two broad categories of permissions: overall permissions regarding the process records for a process being controlled by the system and Can View and Can Edit permissions regarding user-defined fields in the process records and in certain other tables. These permissions were defined for the different group categories. In the configurable process control system of the parent, who could view a process record was further limited only by project membership. Each process record belonged to a project and any member of a project could view the process records for his or her project.

While the foregoing arrangements were adequate for some purposes, they were inadequate for others; in particular, they did not sufficiently limit the users who could view process records nor did they distinguish between creating or deleting a value for a user-defined field and modifying an existing value. It is an object of the inventions disclosed herein to solve these problems of the system disclosed in the parent of the present application and other such systems.

SUMMARY OF THE INVENTION

In one aspect, the inventions provide new user permissions for records in a process control system that are related to processes being controlled by the process. The process control system has a number of users and includes a database system that contains a number of process-related records. In the database system, a particular process-related record is related to a user and the user is associated with a permission value that indicates an extent to which the user may view a process-related record to which the user is related. The process control system permits the user to view a process-related record to which the user is related only to the extent specified by the permission value.

The permission value may give permission based on a number of different relationships between the user and the process-related record:

- The process-related record and the user may both be related to a project and the permission value indicates that the user may view process-related records that are related to the project the user is related to.
- The process-related record is related to a user that created the process-related record and the permission value indicates that the user may view process-related records that were created by the user.
- The user is related to a group of users and the process-related record is also related to a group of users of the plurality thereof and the permission value indicates that the user may view process-related records that are related to the user group to which the user is related.
- The process-related record is related to a user to whom the process-related record has been assigned and the permission value indicates that the user may view process-related records that are assigned to the user.
- the user is related to an entity of a plurality thereof and the record is also related to an entity of the plurality thereof and the permission value indicates that the user may view process-related records that are related to the entity to which the user is related.

There may be a separate permission value for each of the above relationships and a graphical user interface is provided which permits an administrator to set one or more or of the permission values associated with a user.

In another aspect, the inventions provide a configurable system in which users may be given permissions to insert a value into a user-configurable field and/or delete a value from the user-configurable field independently of being able to edit a value in the field.

The configurable system includes a database system in which a user of the configurable system is related to one of a plurality of group categories, the group category is related to a user-configurable field, and the group category and the related user-configurable field are associated with a permission value that specifies whether users related to the group category may insert a value into the user-configurable field and/or delete a value therefrom independently of whether users related to the group category may edit the inserted value. The configurable system permits the user to insert a value into and/or delete a value from the user-configurable field as determined by the permission value.

The insert and delete permissions apply to two different kinds of fields: fields that may contain a single value and fields that may contain zero or more values. With fields that may contain a single value, inserting a value sets the value of a field that has a null value to a non-null value and deleting a value sets the value of a field that has a non-null value to the null value. With fields that may contain zero or more values, inserting a value adds the value to the field and deleting a value removes the value from the field.

In one application of the insert and delete permissions, the field has a value which is an identifier for an editable file and the permission value permits the user to insert the identifier into the field or delete the identifier from the field but does not permit the user to edit the file identified by the identifier. There is an additional permission value that permits the user to edit the file.

The permission values are set by administrators of the configurable system using a GUI which shows the relationships between group categories and field names and the permission value settings for each group category-field name pair.

Other objects and advantages will be apparent to those skilled in the arts to which the invention pertains upon perusal of the following Detailed Description and drawing, wherein:

BRIEF DESCRIPTION OF THE DRAWING

FIG. 1 is an overview of the interface for selecting a process record and the configurable form which appears when a particular user selects the process record;

FIG. 6 is a screen that shows project members, user groups, and group types;

FIG. 7 is a screen that shows how membership in a virtual user group is defined in a preferred embodiment;

FIG. 9 is a screen showing group types;

FIG. 10 is a screen showing how permissions are assigned in group types;

FIG. 11 is a screen showing how group types are related to form template files;

FIG. 13 is a screen showing how a configurable form is configured;

FIG. 14 is another screen showing how a configurable form is configured;

FIG. 16 is a portion of a form template file;

FIG. 17 shows how the form template interpreter constructs an HTML page from the form template file;

FIG. 20 is a window showing the GUI for setting permissions for user-defined fields.

Figure 2:
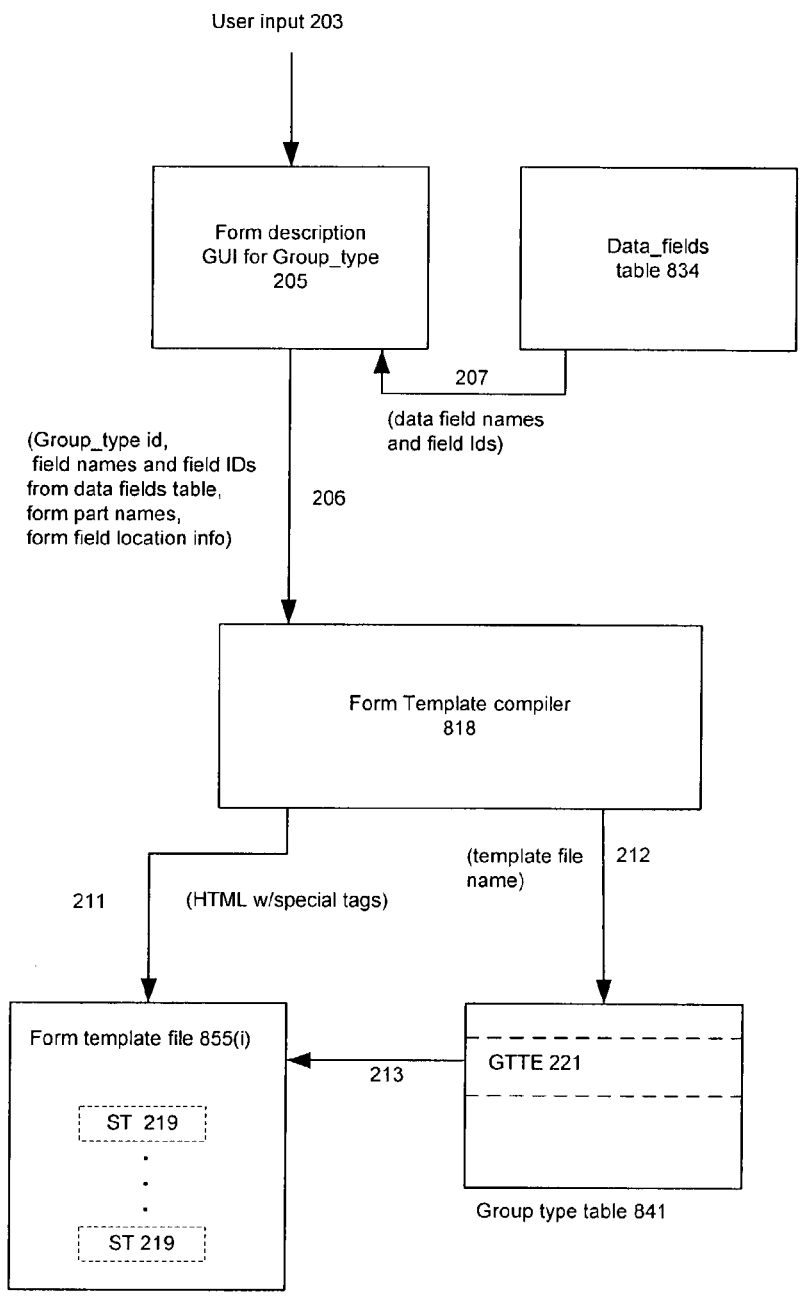
FIG. 2 is a block diagram showing how form template compiler 818 makes a form template file 855(i)

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The techniques for defining context-sensitive user interfaces in highly-configurable systems are embodied in the TrackWise® process control system manufactured by Sparta Systems, Inc., Holmdel Corporate Plaza, 2137 Hwy 35, Holmdel, N.J., 07733. The process control aspects of the TrackWise system are explained in detail in U.S. Ser. No. 10/117,387, Ran J. Flam, Automated process control with user-configurable states that change upon completion of a user-configurable set of activities, filed Apr. 5, 2002. In the following, the aspects of the TrackWise system that embody the techniques of the invention will be described, beginning with a system overview, continuing with an overview of operation of the embodiment, and concluding with details of the data structures and interfaces used to configure the contexts and the user interface itself.

Figure 8:
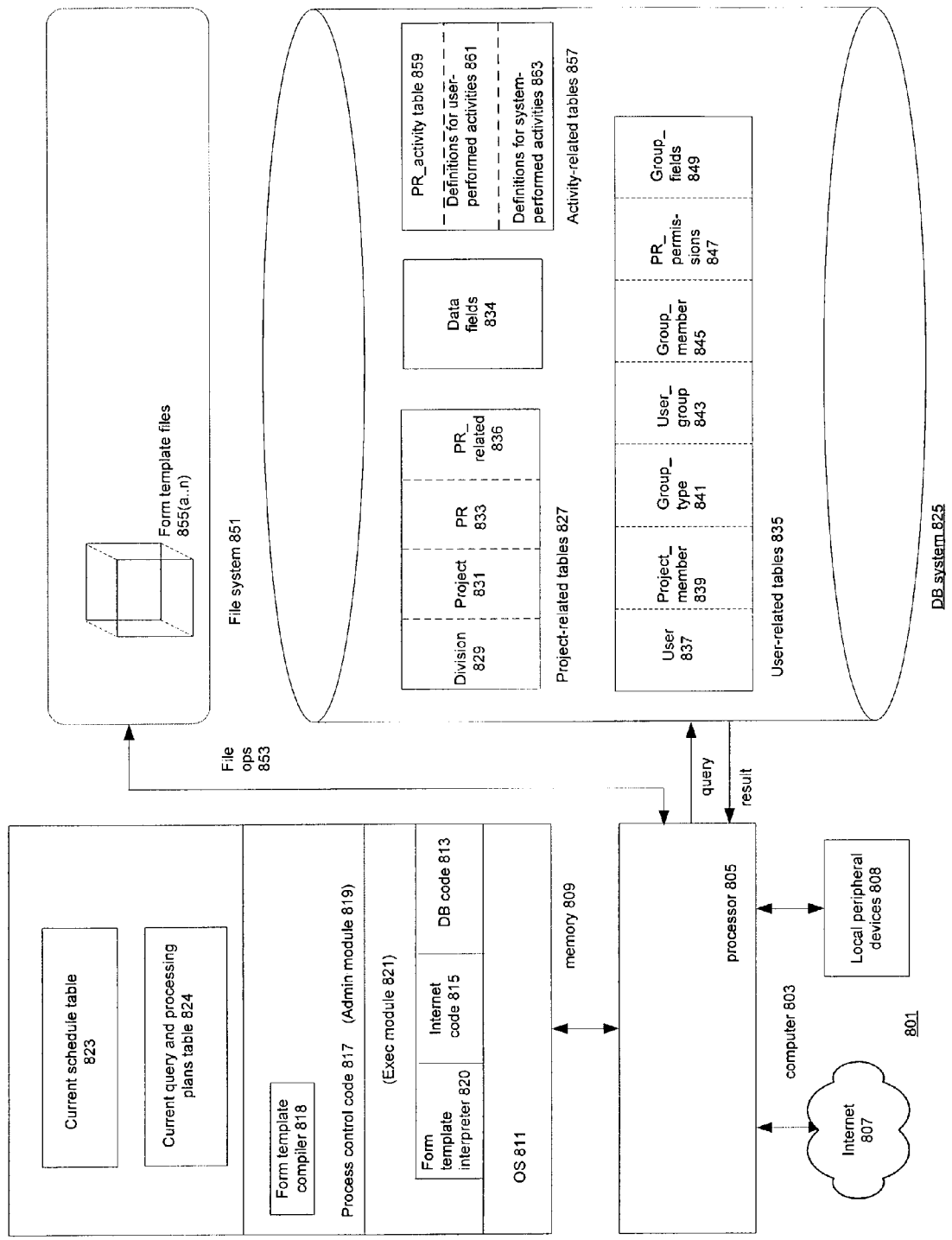
FIG. 8 is a block diagram of a process management system in which a preferred embodiment is implemented.

Overview of the Process Control System: FIG. 8

FIG. 8 is a schematic overview of process control system 801. System 801 is used to control business processes such as handling orders or customer complaints, but system 801 may be adapted for use in any process control application.

System 801 is implemented using a standard computer 803 that is connected to a standard database system 825. In a preferred embodiment, the database system is a relational database system made by Oracle Corporation, of Redwood City, Calif. Standard computer 803 has a processor 805 which is connected to Internet 807 and to local peripheral devices 808 as well as to database system 825 and file system 851, both of which are implemented using non-volatile storage such as is provided by disk drives. Processor 805 has a memory 809 (understood to include both physical and virtual memory) which includes code executed by processor 809. Of interest to the present discussion is standard operating system code 811, which among many other things, implements file system 851, Internet code 815, for performing functions such as email and interacting with Web pages according to the HTTP protocol, database code 813, which is part of and controls the operation of database system 825, and process control code 817, which is application code that implements the process control system. Process control code 817 includes two subdivisions: administrative module 819, which permits users of system 801 to configure and administer system 801, and exec module 821, which performs process control operations. Exec module 821 uses components of the operating system 811, Internet code 815, and DB code 813 to interact with Internet 807, local peripheral devices 808, and DB system 825. With regard to the interaction with DB system 825, process control code 817 issues queries to DB system 825 and receives the results of the queries from DB system 825. Of particular interest in the present context are forms compiler 818, which permits users to configure forms to be displayed on Web browsers, and forms interpreter 820, which makes HTML pages for the configured forms from form template files made by forms compiler 818. System 801 can run on a single computer 803, which functions as a server for the system, or alternatively it can run concurrently on a plurality of servers for load balancing purposes.

In broad terms, process control system 801 works by making a process record for each process that is being controlled in PR table 833 and using predefined queries to retrieve records that indicate conditions of the records' processes that require performance of some kind of activity. The predefined queries are either defined by system 801 or configured by the user. The user-configured queries are contained in tables in database system 825. The activity may either be performed by a user of system 801 using an interactive interface or automatically by system 801. The activities to be performed by system 801 are defined by tables in database system 825. These tables are shown at 857 in FIG. 8 and are described in detail in U.S. Ser. No. 10/117,387. For the present discussion, it is necessary only to note that the tables in 857 contain three kinds of information: definitions for user-performed activities 861, definitions for system-performed activities 863, and PR_activity table 859, which is a table of all of the activities that have been performed or are currently scheduled for the process represented by a particular process record in PR table 833. A process record may contain user-defined data fields. The user-defined data fields may of course be referred to in queries and the activities may read and set the user-defined data fields. The definitions for all of the user-defined data fields in the PR table and in certain other tables in database system 825 are contained in data fields table 834. Among these tables are PR-related tables 836. Records in these tables contain additional information about processes. The records in these tables for a particular process may be located using the identifier for the particular process's record in PR table 833.

To give a concrete example, one type of process that can be controlled by system 801 is a customer complaint. The exemplary process for dealing with a customer complaint is to assign it to a customer complaint specialist. The customer complaint specialist is to investigate the complaint and reply to the customer within a set time period. If the reply is not timely, the complaint is escalated to the customer complaint specialist's supervisor, again with a time limit for the supervisor to deal with the problem. The activity that corresponds to the escalation is the dispatch of an email message to the supervisor. In system 801, when the complaint arrives, a process record for the complaint is made in a table in PR tables 827. When the complaint specialist replies to the customer, the specialist alters the process record to indicate that the complaint specialist has replied and the time of the reply. System 801 periodically runs a query which queries PR table 833 for process records that indicate that the complaint specialist has not timely replied. The query further specifies that when the complaint specialist has not timely replied, the activity to be performed is to escalate the complaint by sending email to the supervisor. When system 801 finds such a record in PR table 833, it performs the specified activity, as defined by data values in the process record and activity definitions in tables 857.

As can be seen from the foregoing, a process record returned by a query provides the operation aspect of the context; the user aspect is provided by information in the tables in user-related tables 835. These tables relate users to projects and to user groups within projects. Each process record belongs to a project. Given a user of system 801 and a project, it is possible to determine which user group the user belongs to. The user interface that system 801 provides a user for accessing a process record selected by the user is determined by the project the selected process record belongs to and the user group the user belongs to. In a preferred embodiment, the user interface is an HTML page that is made using a form template file 855(i) in file system 851 of system 801. Form template field 855(i) is associated with the user group the person belongs to. Providing the HTML page to the user and receiving the user's inputs to the HTML page are handled by Internet code 815. The user interface is thus sensitive both to the user and operation aspects of the context. Further, as will be explained in detail in the following, users may configure form templates in form template files 855 without knowledge of HTML in particular or Web programming in general.

The use of tables in DB system 825 to determine the behavior of the process control system makes system 801 highly configurable, not only with regard to the activities it can perform, but also with regard to the user and operation contexts. The use of tables also limits the configurability so that it can be safely done by non-technical users of system 801. All of the tools provided by DB system 825 for configuring entries in its tables are available to configure the entries in the tables of system 825, as are the user interfaces which DB system 825 provides for those tools.

Figure 1:
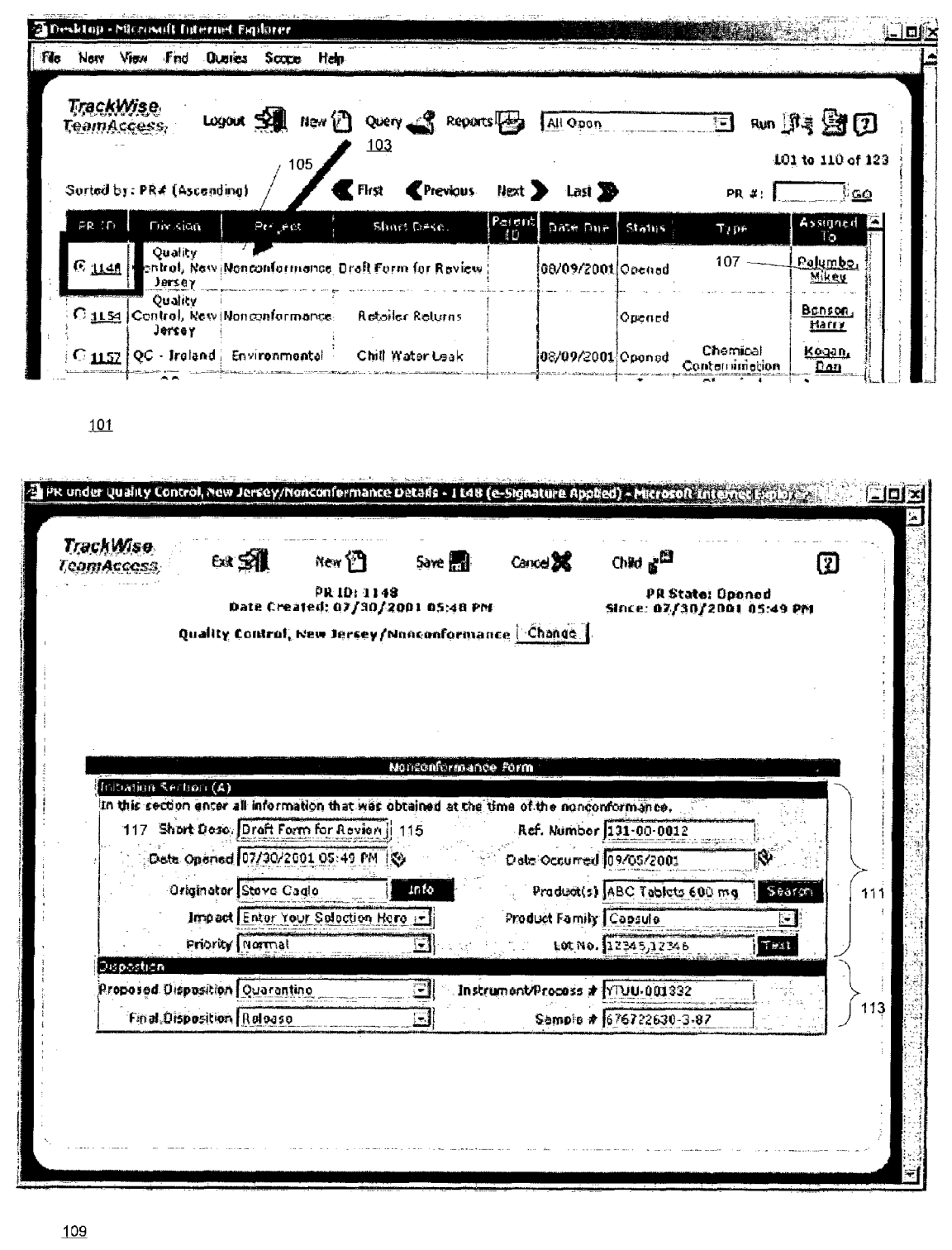

Overview of the Context-Sensitive User Interface: FIG. 1

As indicated above, users of system 801 interact with it by means of their Web browsers. System 801 outputs an HTML page to the Web browser, the user provides inputs to the HTML page, and system 801 responds to the inputs by providing another HTML page. The contents of the HTML page generally include values from records in DB system 825 and in many cases, the inputs from the user set values in records in DB system 825.

FIG. 1 shows an interaction involving the context-sensitive user interface. Windows produced by two HTML pages are shown. The first, window 101, is a list of process records returned by a query on PR table 833. The list in window 801 is returned by a predefined query called "All Open" that returns the process records for all processes that have not been closed. The fields shown in entry 103 for each process record are determined by the query; here they include the record's unique ID number, the division and project (105) it belongs to (each project belongs to a division), a short description of the record's contents, the due date for the next activity to be performed in the process, the record's status, its type, and the responsible person (107).

As a result of the log-in process performed by its users, system 801 knows the identity of the user who is viewing the screen of FIG. 1. When the user uses the radio button in the record ID field to select one of the entries in window 101, system 801 determines from the user identity what user group in that project the user belongs to. Form template interpreter 820 then uses the {project, user group} tuple just determined to locate a form template file 855(i) for the selected entry and the selecting user. Here, the user belongs to the user group "Full Permissions" in the project "Nonconformance", and when the user selects entry 105, form template interpreter 820 uses the form template file 855(i) corresponding to the project specified in the project field of the entry in window 101 and the user group to which the user belongs, to create the HTML page. Internet code 815 then provides the HTML page to the user's browser. When the browser displays the page, the result is screen 109. Screen 109 is an example of a configurable form made according to the techniques disclosed herein. In the TrackWise system, a configurable form is termed a ConfigForm. "ConfigForm" is a trademark of Sparta Systems, Inc.

The fields 115 shown in screen 109 permit the user to read and/or write values of variables in the selected process record and/or records accessible via the selected process record in PR_related tables 836 which are relevant to the function performed in the project to which the record belongs by the user group to which the user belongs. Screen 118 is divided into two parts, 111 and 113. Part 111 contains values which were set at the time the process record was created; part 113 contains values which the user who is responsible for the process sets in the course of dealing with and terminating the process. The screen parts, which variables 115 appear in screen 109, how they are labeled, how they are arranged, and how the user may access them are all configurable in system 801. Furthermore, an interactive interface in system 801 permits users to produce screens like screen 809 without knowledge of HTML programming or use of a Web page creation system.

Overview of Making a Form Template 855(*i*): FIG. 2

FIG. 2 gives an overview 201 of how form template compiler 818 uses user input from a graphical user interface for constructing a form template 855(*i*) and information from Data_fields table 834 to construct form template file 855(*i*) for a given user group of a given project. In the preferred embodiment, this is done by constructing or editing the form template file 855(*i*) for a particular group type. Each user belonging to a project belongs to a single user group of the project and each user group has a single group type, but a number of user groups may have the same group type. In the preferred embodiment, there is a single form template file 855(*i*) for each group type. An individual is thus related to a particular form template file 855(*i*) by way of the individual's project and user group membership and the group type for the user group. As explained later on, for any process record, when the user selects a process record, system 801 determines the user's user group at that time and selects the form template file 855(*i*) for the group type associated with the user group.

As will be explained in more detail later, user input 203 is input via a form description GUI 205; by the time the user who is specifying the form template file has reached GUI 205, he or she has already specified the group type to which the form template file being made or edited belongs. Using the GUI, the user specifies for user groups belonging to the group type which fields of process records and related records in PR-related tables 836 will appear in configurable form 109 which members of the user groups use to interact with a process record and where these fields should appear in the form. The users specify the fields by name, selecting them from a drop-down list of fields defined in data fields table 834 that may be used in the configurable form 109 for the group type. How the fields that are available to be used in the configurable form 109 for a particular group type are selected will be explained later. In specifying the arrangement, the user may further subdivide configurable form 109 into sections, name the sections and provide matter such as instructions in them, and arrange the fields in the sections. Additionally, the configurable form may include a URL. When the user activates the URL in configurable form 109, the browser fetches the Web page referred to by the URL in the usual fashion. For example, the Web page may contain extended directions such as standard operating procedures that are relevant to the configurable form.

As seen at 206, the information which form template compiler 818 receives from the form description GUI includes the identifier for the entry for the group type in Group_type table 841, the field names of the fields of interest in Data_fields table 834 as well as the identifiers for those fields in Data_fields table 834, and the arrangement of the fields in the configurable form 198. Form template compiler 818 generates template file 855(*i*) from the data field name, data field ID, and field position information.

When compiler 818 encounters a field name in data fields table 834, it uses the ID for the record in data field 834 in special HTML tags in form template file 855(*i*). A number of such special tags appear at ST 219 in form template file 855(*i*) in FIG. 2. Form template interpreter 820 then uses the IDs in the special tags when it generates the HTML for configurable form 109 to locate the records for the fields in Data_fields table 834. An advantage of this arrangement is that it guarantees that the information in Data_fields table 834 and Group_fields table 849 that is current when the configurable form is generated is used to generate the form. Another advantage is that the user who is making form template 855(*i*) need know nothing about the internals of Data_fields table 834. When form template compiler 818 has generated form template file 855(*i*), it writes it to form template files 855 in file system 851; if the form template file 855(*i*) is new, it writes the name of the file in file system 851 into the entry in group type table 841 for the project and user group for which the form template was defined.

Figure 3:
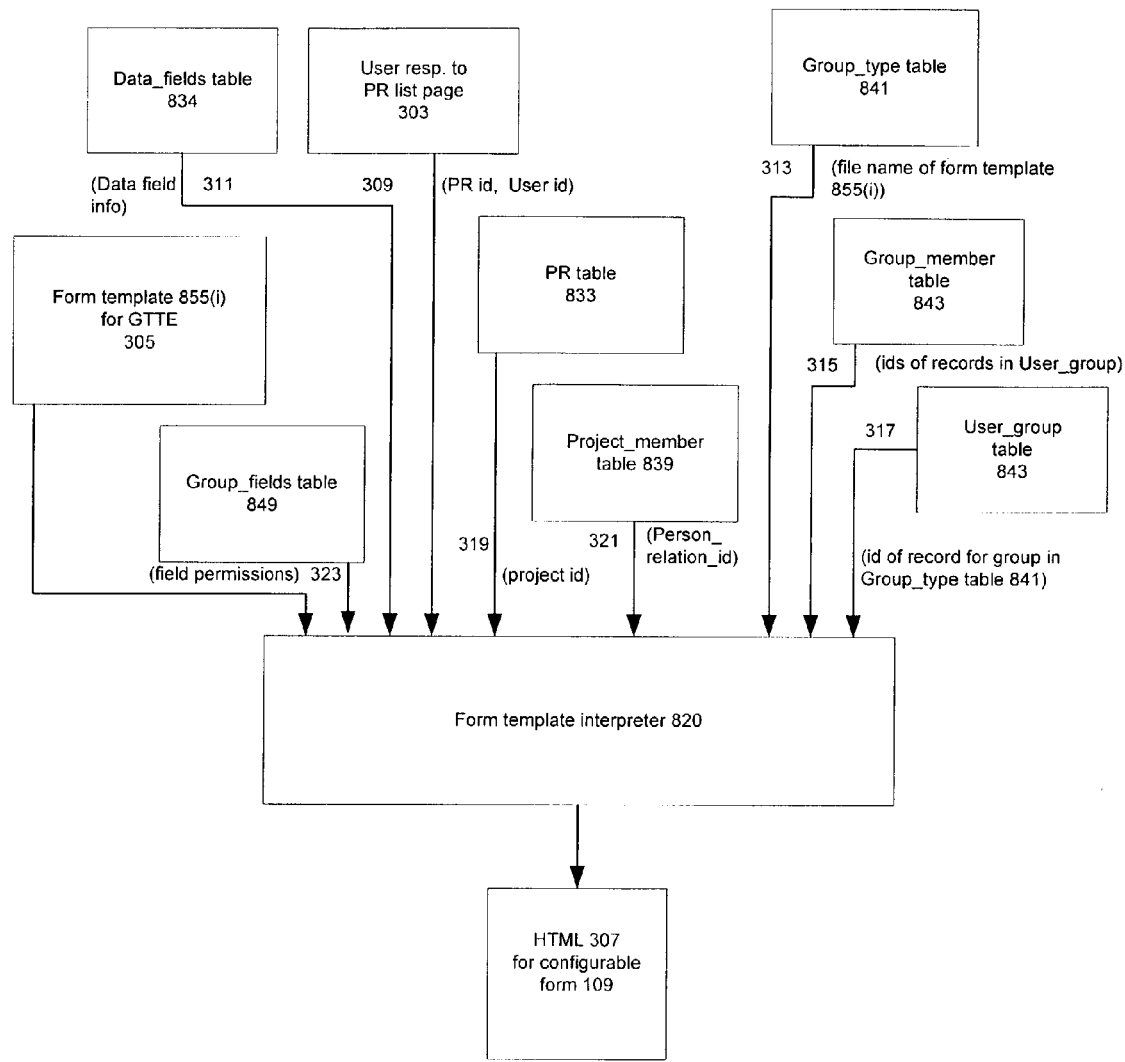
FIG. 3 is a block diagram showing how a form template interpreter makes an HTML page from a form template file.

Overview of Generating an HTML Page from Form Template 855(*i*): FIG. 3

FIG. 3 provides an overview 301 of how form template interpreter 820 generates an HTML page from a form template 855(*i*) when a particular user responds to PR list screen 101 by selecting an entry 103 for a process record. In generating the HTML page, form template interpreter 820 uses the process record id and the user id information returned from screen 101 when the user selects the entry 103 to locate user to locate form template 855(*i*) corresponding to the project to which the process record belongs and the group type of the user group to which the user belongs and then uses form template 855(*i*) together with information in Data_fields table 834 and Group_fields table 849 for the fields of the process record that are to appear in the screen to generate HTML page 307. System 801 then provides page 307 to the user's browser, which uses it to make configurable form 109.

Continuing in more detail, as shown at 303, when the user selects an entry for a process record in screen 101, system 801 receives the process record ID for the selected record; the system has the user's user ID from when the user logged on to begin the interaction that led to the selection of the process record. System 801 invokes form template interpreter 820, providing it with the user ID and the process record ID. The next step is locating form template 855(*i*) for the project and user group the user belongs to.

This is done as follows: Form template interpreter 820 first queries Project_member table 839 to determine whether the user belongs to the project; if the user does, form template interpreter 820 queries Group_member table 845 with the user's user ID to determine the user group ID for the user group the user belongs to in the project. Using the user group ID returned by the query, form template interpreter 820 queries User_group table 843 to find the ID for the user group's entry in group_type table 841. Finally, it uses the group type ID to query Group_type_table 841 to obtain the file name of form template 855(*i*) used by user groups having that group type.

Having thus obtained the file name of form template 855(*i*), form template interpreter 820 retrieves the form template and generates the form from the form template. Wherever form template interpreter 820 encounters a special tag, it consults the record in data fields table 834 specified in the special tag to determine the data field's data type and other information relevant to how the browser will display values of the field in screen 109 and handle inputs to the field in screen 109. In generating the HTML for a data field, form template interpreter 820 also consults the entry for the data field in Group_fields table 849 to determine what kinds of permissions members of user groups belonging to the group type have with regard to the field and produces HTML that provides corresponding behavior of the field in screen 109. For example, if a data field's entry in Group_fields table 849 for the group type and field specifies only that the field has the can_view permission, the HTML which produces the display of the field will not permit the user to input data to the field. In other embodiments, form interpreter 820 may similarly consult other tables in generating HTML 307. For example, if a user has preferences or requirements concerning the appearance or language of configurable form 109, form interpreter 820 could consult tables relating those preferences to the user and generate configurable form 109 according to those preferences or requirements. A simple example here would be a choice of colors for the form that would make it easier to read for a user who was color blind.

Virtual User Groups

As described thus far, the configurable form 109 which a user sees when a user selects a process record in screen 101 is determined solely by the user group the user belongs to in the project to which the process record belongs. That user group has a single group type, and configurable form 109 is associated with the user group's group type. In the preferred embodiment, the kind of user group membership that a user acquires in this fashion is the user's default user group membership. Additionally, however, a user's user group, and consequently, the permissions granted to the user, and the configurable form 109 which the user sees, may be determined by other factors, for example the operation which the user is performing on the process record or a value of a data field in the in the process record or records in PR_related tables 836 that are related to the process record or values of a number of data fields from those records. User groups whose memberships are so determined are termed herein virtual user groups. Membership in a virtual user group overrides membership in the default group.

For example, as will be seen in more detail below, a process record in a preferred embodiment includes fields that indicate the user who created the process record and the user who is presently responsible for it, and when a user's user ID appears in one or both of these fields, the user may become member of a virtual user group by virtue of that fact. Virtual user groups are associated with group types like regular user groups, and thus the configurable form 109 that the user sees may depend on whether the user created the record, whether the user is presently responsible for it, or both. Similarly, in a preferred embodiment, a user may become a member of a virtual user group by performing a particular operation on a process record, for example, creating a new process record. As is the case with default user groups, there is only one group type associated with the virtual user group. As explained in detail below, a GUI in the preferred embodiment permits virtual user groups to be specified for the members of a particular project.

It should be pointed out here that the virtual user group is a general mechanism for determining user group membership and therefore the configurable form 109 that the user sees at run time, i.e., on the basis either of a value that is determined when a process record is returned by a query or on the basis of an operation that the user performs on a process record. Indeed, the default user group can be seen as a special case of the virtual user group where the user group is defined by the project and user group membership of the user as specified in tables 839 and 845 at the time the user selects a process record in screen 101. In other embodiments, users may be able to configure a virtual user group by specifying the operation or fields whose values determine membership in the user group and in the case of the fields, specifying field values or relationships between field values that determine user group membership, and specifying a group type for the user group. In addition, users may be able to specify a virtual user group as the default user group. To give a simple example, what virtual user group a user belongs to could be determined from the value of the status_type field in the process record and from the user's user group as determined from his or her log in to the system and the project the process record belongs to. The value of the status_type field indicates the current status of the process record, and thus, by means of this mechanism, what configurable form 109 a user saw would depend on the current status of the process record, as well as on the user's user group membership.

Details of User-Related Tables 835

The following discussion of the details of user-related tables 835 will begin with an entity-relationship diagram showing how the tables are related to each other and to project-related tables 827 and will go on to present the details of each of the relevant tables.

Figure 4:
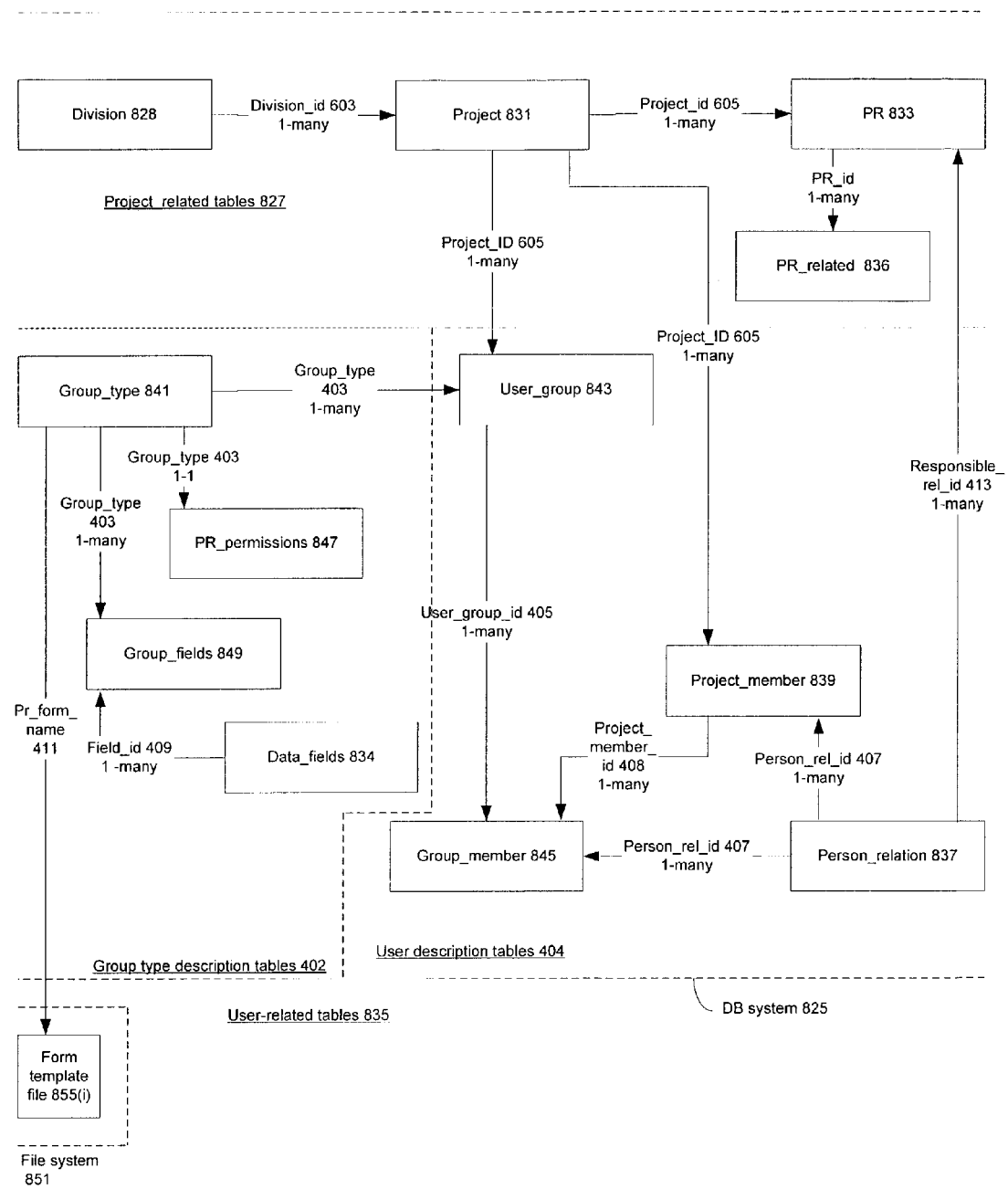
FIG. 4 is an entity-relationship diagram for database tables that are of particular interest.

Relationships Between User-Related Tables and Project-Related Tables: FIG. 4

FIG. 4 is an entity relationship tables which shows the relationships between user-related tables 835 and project-related tables 827. In the table, each oblong indicates a table in DB system 825. The arrows indicate relationships between rows of the tables connected by the arrow. The table at the tail end of the arrow contains a field whose value appears in a field of one or more rows of the table at the head end of the arrow. The relationship between the record in the table at the tail of the arrow and the records in the table at the head of the arrow may be one-to-one, i.e., the table at the head of the arrow has exactly one row with a field that contains the value of the field in the row of the record at the tail of the arrow, or one to many, where the table at the head of the arrow may have many rows with fields containing the value of the field in the row of the record at the tail of the arrow. In this implementation, the field values that establish the relationships between the tables shown in FIG. 4 are identifiers of records in the tables at the tails of the arrows. In a preferred embodiment, the identifiers are unique in the tables at the tails of the arrows.

Beginning the project-related tables 827, each project belongs to a single division. There is a record for each division in division table 828 and a record for each project in project table 831. The record for a project contains the identifier of its division's record in division table 823. Each process record in PR table 833 belongs to a single project, and the process record contains the identifier of the project's record in project table 831. Process records in PR table 833 are related to records in PR-related tables 836 by the PRid of the process record. Projects are further related to users and user groups via User_group table 843 and to users via Project_member table 839.

Continuing with user description tables 404, these tables relate users to projects, process records, and user groups. Each user of system 801 has a record in person_relation table 837: the identifier person_rel_id 407 for a user's record in Person_relationship table 837 appears in records in Project_member table 839 for the projects the user is a member of and in Group_member table 845 for the user groups the user is a member of. Additionally, a number of fields in a process record may contain values that are identifiers of records in Person_relationship table 837; one of these, responsible_rel_id 413, is shown in FIG. 4; it identifies the person who is currently responsible for the process represented by a given process record. Project_member table 839 relates users to projects; Group_member table 845 relates user groups to persons and projects; User_group table 843, finally, defines user groups and relates them to projects, project members, and group types.

Group type description tables 402 define group types and relate them to user groups. Each group type has a row in Group_type table 841. Included in the row is the name of its form template file 855(i) in file system 851, an ID for the record containing its group type permissions in PR_permissions 847, and IDs for the records containing its data field permissions in Group_fields 849. Each record in Group_fields 849 further contains the id of the record in Data_fields 834 for the data field to which the record's permissions apply.

Details of the Project-Related and User-Related Tables

The following table descriptions describe the fields of the records in each of the tables.

Project Table 831

A record in Project table 831 looks like this:

```
Project  (
         id                   NUMBER (12) NOT NULL,
         name                 VARCHAR2 (80) NOT NULL,
         division_id          NUMBER (6) NOT NULL,
         project_type         NUMBER (6) NOT NULL,
         orig_group_type      NUMBER (12),
         resp_group_type      NUMBER (12),
         vgc_while_create     NUMBER (2),
         overriding_vgc       NUMBER (2),
         created_by_rel_id    NUMBER (12) NOT NULL,
         updated_by_rel_id    NUMBER (12) NOT NULL,
         date_created         DATE NOT NULL,
         date_updated         DATE NOT NULL,
         primary key(id)
)
```

Project table 831 has a record for each project defined for a given database. As described above, every process record is associated with a given Project, and thus, it can be said that all process records in a database are "user grouped" by their respective Projects. Similarly, a Project is associated with a given record in Division table 829, and thus, it can be said that all Projects in a database are further "user grouped" by their respective Divisions.

This table contains the following data fields: (a) id: a unique ID in this table, (b) name: Project name, e.g., "Customer Support", "R&D Work Items", and "Assembly Line Controls", (c) division_id: a specific Division ID that a given Project is associated with; thus enabling the user grouping of Projects by Divisions, and (d) project_type: a value from a "Project Type" pick-list, with possible selections such as: "Manufacturing", "Administrative", and "Human Resources". Fields (e) through (h) are used to define virtual user group membership in a preferred embodiment and will be described in more detail below. Continuing with fields (i . . . l), (i) created_by rel_id: a specific ID of a person who created the given Project record in this table, (j) updated_by_rel_id: a specific ID of a person that last updated the given Project record in this table, (k) date_created: date/time that the given Project record was created in this table, and (l) date_updated: the date and time that this record was last updated.

In a preferred embodiment, system 801 may automatically override a user's default user group membership in a project with one of three virtual user group memberships with regard to a process record for a the project while the user is interacting with the process record. Whether system 801 will override the default user group membership and what user group membership system 801 will give the user if it does is determined by the following factors:

whether the user is now creating the process record;
whether the user was the creator of the process record;
whether the user is currently responsible for the process record's process; and
whether the user is both the creator of the process record and the person currently responsible.

Fields (e . . . h) provide the mechanism by which system 801 makes its determination with regard to virtual user group membership when a user begins interacting with a process record belonging to the project. (e) orig_group_type: a specific ID of a Group type in Group_type table 841, which specifies the Group type for the virtual user group that a user will belong to while interacting with the process record if she/he was the creator of a given process record, (f) resp_group_type: a specific ID of a Group type in Group_type table 841, which specifies the Group type for the virtual user group that the user will belong to if she/he is the person currently responsible for a given process record, (g) vgc_while_create: a specific ID of a Group type in Group_type table 841, which specifies the Group type for the virtual user group that the user belongs to while she/he is in the process of creating a new process record, (h) overriding_vgc: a value of 1 or 2, which decides which virtual user group a user will belong to when the user is both the originator and responsible person for a process record. If the value of this field is "1" the virtual user group membership will be in the user group for the originator; otherwise it will be in the user group for the responsible person. Of course, the user interface which a user belonging to each of these virtual user groups sees is the one specified by the group type for the user group in the Project table record for the project. The graphical user interface that is used in a preferred embodiment to define these virtual user group memberships will be described in detail later.

Division Table 829

A division table record looks like this:

```
Division (
         id                   NUMBER (12) NOT NULL,
         name                 VARCHAR2 (80) NOT NULL,
         created_by_rel_id    NUMBER (12) NOT NULL,
         updated_by_rel_id    NUMBER (12) NOT NULL,
         date_created         DATE NOT NULL,
         date_updated         DATE NOT NULL,
         primary key(id)
)
```

The Division table is a table that contains all Divisions defined for a given database. A Division is a user group of Projects, and a Project is a user group of project records. This table contains the following data fields: (a) id: a unique ID in this table, (b) name: Division name, e.g., "California Site", and "New Jersey Site", (c) created_by_rel_id: a specific ID of a person who created the given Project record in this table, (d) updated_by_rel_id: a specific ID of a person that last updated the given Division record in this table, (e) date_created: date/ time that the given Division record was created in this table, (f) date_updated: the date and time that this record was last updated.

PR Table 833

A record in PR table 833 looks like this:

```
PR (
        id                      NUMBER (12) NOT NULL,
        project_id              NUMBER (12),
        ref_number              VARCHAR2 (40),
        name                    VARCHAR2 (80),
        parent_id               NUMBER (12),
        status_type             NUMBER (6),
        category_type           NUMBER (6),
        reason_opened_type      NUMBER (6)
        priority_type           NUMBER (6),
        severity_type           NUMBER (6),
        exposure_type           NUMBER (6),
        entity_id               NUMBER (12),
        customer_rel_id         NUMBER (12),
        originator_rel_id       NUMBER (12),
        responsible_rel_id      NUMBER (12),
        required_time           NUMBER (10, 2),
        required_cost           NUMBER (12, 2),
        date_opened             DATE,
        date_due                DATE,
        date_closed             DATE,
        date_last_activity      DATE,
        date_current_state      DATE,
        is_closed               NUMBER (1),
        date_created            DATE NOT NULL,
        date_updated            DATE NOT NULL,
        created_by_rel_id       NUMBER (12),
        updated_by_rel_id       NUMBER (12),
        primary key (id)
)
```

PR table 833 contains all process records in database system 825. The data fields in this table describe a process and contain such information as priority, customer and date due. A first user group of the fields must appear in every process record; other fields may be added as required by the application. The other fields in the present example offer a typical example of how a process record may be configured. All of the fields that are available for use in process records and in records in PR_related tables 836 are defined in Data_fields 834, which includes both system-defined and user-defined fields.

Essential Fields

The essential fields of a process record are: (a) id: a unique ID for the record in this table, referred to in FIGS. 6 and 7 as pr_id 607, (b) project_id: the ID of the record in Project table 831 for the project that the project represented by the given process record belongs to, (c) date_created: the exact date/time that a given process record is created, i.e., that the given row into the process record has been inserted, (d) date opened: the date/time that the associated process, event, etc. should be associated with, e.g., the date/time that a customer called with a request, (e) parent_id: the ID of a parent process record, if any, (f) status_type: current status of the process record, e.g., "Opened", and "Work in Progress", (g) is_closed: a Boolean value indicating whether a process record is closed or is still active, (h) date_due: the date due for completing a process, i.e., date due for closing a process record, (i) created_by_rel_id: a specific ID of a person who created the given process record in the database, (j) originator_rel_id: a specific ID of a person who is considered the originator or the "sponsor" of the given process record, (k) responsible_rel_id: a person that is assigned to the given process record, referred to as the Assigned To, (l) updated_by_rel_id: a specific ID of a person that the given process record was last updated by, (m) date_current_state: a date/time that the status of the given process record was last changed, (n) date_closed: a date/time that the given process record was closed, if at all, (o) date_last_activity: a date/time that a PR Activity was last performed for the given process record, (p) customer_rel_id: a specific ID of a contact associated with the given process record, (q) entity_id: a specific ID of a company associated with the given process record, and (r) date_updated: a date and time that a given record in the PR table was last updated.

Fields Defined for a Particular Application

The following additional process record data fields are examples of additional fields that users of system 801 with the proper permission can define as needed by adding or modifying records in Data_fields table 834: (s) category_type: a value from a "Category" pick-list, with possible selections such as: "Hardware", "Software", and "Documentation", (t) reason_opened_type: a value from a "Reason Opened" pick-list, with possible selections such as: "Service Request", "Problem Report", and "Request for Information", (u) priority_type: a value from a "Priority" pick-list, with possible selections such as: "Low", "Medium", and "High", (v) severity type: a value from a "Severity" pick-list, with possible selections such as: "Low", "Medium", and "High", (w) exposure_type: a value from an "Exposure" pick-list, with possible selections such as: "Limited", "All Customers", and "All Customers and Employees", (x) required_time: estimated time to complete the process represented by the record, (y) required_cost: estimated time to complete the process represented by the record.

Details of the User Description Tables 404

User_Group 843

This table is used to define User groups in system 801:

```
CREATE TABLE User_group
(
        id              NUMBER (12),
        name            VARCHAR2 (40),
        abbrv_name      VARCHAR2 (18),
        project_id      NUMBER (12),
        group_type      NUMBER (6),
        date_updated    DATE
)
```

The fields in the User_group table have the following meanings:

a) id: the unique identifier for a row in the table.

b) name: the name the user creating the user group assigns to the given User group.

c) abrv_name: abbreviation of the User group name (first 18 characters).

d) project_id: the id of the Project that this User group belongs to. Value: the identifier of the project's record in the Project table e) group_type: the id of the entry in Group_type table 841 for this User group. Value: the identifier of the user group's row in the Group_type table f) date_updated: the date and time this row was last updated.

Project_Member 839

This table is used to store the project membership of TrackWise users:

```
CREATE TABLE Project_member
(
    id                  NUMBER (12) NOT NULL,
    project_id          NUMBER (12) NOT NULL,
    person_relation_id  NUMBER (12) NOT NULL,
    person_role_type    NUMBER (6) NOT NULL,
    date_start          DATE NOT NULL,
    date_end            DATE,
    percent_involved    NUMBER (2),
    is_active           NUNBER (1),
    auto_assigned_to    NUMBER (4),
    date_updated        DATE NOT NULL,
    seq_no              NUMBER (6),
    view_by_entity      NUMBER (2),
    view_all            NUMBER (2),
    view_group_created  NUMBER (2),
    view_self_created   NUMBER (2),
    view_assigned_to    NUMBER (2)
)
```

The fields in the Project_member table have the following meanings:
a) id: the unique identifier for a row.
b) project_id: the id of the corresponding project. Value: the identifier of the project's record in the project table.
c) person_relation_id: the id of the corresponding person (TrackWise User). Value: the identifier of the user's record in the User table.
d) person_role_type: the id role of the given TrackWise user in the given project. Value: the entry for the role in the Person_role_type table (not shown).
e) date_start: the date involvement of the given person in the given project started.
f) date_end: the date involvement of the given person in the given project ended.
g) percent_involved: amount of involvement of the given person in the given project.
h) is_active: flag (Possible values 1/0) denoting whether the given person is an active member of the given project.
i) auto_assigned_to: flag (Possible values 1/0) denoting whether new records in the given project should be automatically assigned to the given TrackWise user.
j) date_updated: the date and time this row was last updated.
k) seq_no: sequence number assigned to the given row.
l) view_by_entity: flag (Possible values 1/0) denoting whether the given TrackWise user has view permissions to records in the given project created in his or her entity.
m) view_all: (Possible values 1/0) denoting whether the given TrackWise user has view permissions to all the records in the given project.
n) view_group_created: (Possible values 1/0) denoting whether the given TrackWise user has view permissions in the given project to all records created by the same user group.
o) view_self_created: (Possible values 1/0) denoting whether the given TrackWise user has view permissions in the given project to records she (he) created.
p) view_assigned_to: (Possible values 1/0) denoting whether the given TrackWise user has view permissions in the given project to records where she (he) is the 'assigned to' person.

Group_Member Table 845

This table is used to create a relationship between users and user groups in system 801:

```
CREATE TABLE Group_member
(
    id                 NUMBER (12),
    person_rel_id      NUMBER (12),
    user_group_id      NUMBER (12),
    project_member_id  NUMBER (12),
    date_updated       DATE
)
```

The fields in the Group_member table have the following meanings:
a) id: the unique identifier for a row.
b) person_rel_id: the id of the given user. Value: the identifier for the user's record in the User table.
c) user_group: the id of the given user group. Value: the identifier for the record for the user's user group in this project in the User_group table.
d) project_member_id: the id of the given project member entry. Value: the identifier for an entry in ID in Project_member_table 839
e) date_updated: the date and time this row was last updated.

Group_Type Table 841

This table is used to store TrackWise User group Categories (Security User groups):

```
CREATE TABLE Group_type
(
    id             NUMBER (12) NOT NULL,
    name           VARCHAR2 (40),
    abrrv_name     VARCHAR2 (18),
    date_updated   DATE NOT NULL,
    seq_no         NUMBER (4),
    pr_form_name   VARCHAR2 (254),
    activity_location NUMBER (2),
)
```

The fields in the Group_type table have the following meanings:
a) id: the unique identifier for a row in the table.
b) name: the name the user gives to the given Group type.
c) abrv_name: abbreviation of the Group type name (first 18 characters).
d) date_updated: the date and time this row was last updated.
e) seq_no: sequence number the user assigns to this User group
f) pr_form_name: the file name of form template file 855 for this Group type.
g) activity_location: flag specifying the location of the 'Post Activity' section on the HTML page produced from the form template. Possible values are 0=NONE ('Post Activity' section will not be put on the HTML page); 1=TOP ('Post Activity' section will be places on the top of the HTML page); 2=BOTTOM ('Post Activity' section will be places on the bottom of the HTML page).

PR_Permissions Table 847

This table is used to store overall permissions for a members of a user group having the group type to which the PR_permissions record belongs.

```
CREATE TABLE PR_permissions
(
        id                  NUMBER (12),
        group_type          NUMBER (6),
        can_open            NUMBER (1),
        can_reopen          NUMBER (1),
        can_assign          NUMBER (1),
        can_post_activity   NUMBER (1),
        can_create_child    NUMBER (2),
        date_updated        DATE
)
```

The fields in the PR_permissions table have the following meanings:
a) id: the unique identifier for a row in the table.
b) group_type: the id of a record in Group_type table 841 for the Group type for which these permissions are defined.
c) can_open: a flag denoting whether members of user groups having the group type may create new process records. Possible values: 1/0.
d) can_reopen: a flag denoting whether members of user groups having the group type may reopen closed process records. Possible values: 1/0.
e) can_assign: a flag denoting whether members of user groups having the group type may assign, reassign, or unassign process records. Possible values: 1/0.
f) can_post_activity: a flag denoting whether members of user groups having the group type may post an activity to a process record. Possible values: 1/0.
g) can_create_child: a flag denoting whether members of user groups having the group type may create process records that are children of existing process records. Possible values: 1/0.
h) date_updated: the date and time this row was last updated.

Group_Fields Table 849

This table defines the permissions for members of user groups having the group type with regard to the data fields that are displayed in the screen generated from HTML page 307 made from the group type's form template file 855(*i*).

```
CREATE TABLE Group_fields
(
        id              NUMBER (12),
        group_type      NUMBER (6),
        field_id        NUMBER (12),
        can_view        NUMBER (2),
        can_edit        NUMBER (2),
        date_updated    DATE
)
```

The fields in the Group_fields table have the following meanings:
a) id: the unique identifier for a row in the table.
b) group_type: the id of the record in Group_type table 841 for the group type for which these field permissions are being defined.
c) field_id: the id of the corresponding field. The field's value is the ID of the record in the data_fields table for the field in the process record for which permissions are being defined for members of user groups belonging to the group type.
d) can_view: a flag denoting whether members of groups having the group type may view this field of the process record. Possible values: 1/0.
e) can_edit: a flag denoting whether members of user groups having the group type may edit this field of the process record Possible values: 1/0.
f) date_updated: the date and time this row was last updated.

Data_Fields Table 834

Data fields table 834 has a record for each field defined in user-extensible tables, including PR table 833 and the PR_related tables 836, used in system 801

```
CREATE TABLE Data_fields
(
        id                  NUMBER (12),
        field_type          NUMBER (6),
        name                VARCHAR2 (30),
        name_dft            VARCHAR2 (30),
        is_visible          NUMBER (1)
        field_class         NUMBER (6),
        sort_by             NUMBER (2),
        copy_to_child       NUMBER (1),
        pr_element_type     NUMBER (6),
        valid_date_type     NUMBER (2),
        is_table_driven     NUMBER (2),
        highlight_changes   NUMBER (2),
        url                 VARCHAR2 (254),
        param_name          VARCHAR2 (254),
        is_masked           NUMBER (2),
        parent_id           NUMBER (12),
        date_updated        DATE
)
```

The fields in the Data_fields table have the following meanings:
a) id: the unique identifier for a row.
b) field_type: flag denoting the type of the field. 1=Process Record Field; 2=Entity Field; 3=Person Field. Fields of field_type 1 include fields in process records and fields in records in the PR_related tables.
c) name: a user-defined name for the given field.
d) name_dft: the default name of the field. It is used if there is no user-defined name.
e) is_visible: flag that denotes whether the given field is visible. Possible values: 1/0.
f) field_class: the type of the field, i.e. String, Number, Date, etc. A full listing of field class values in a preferred embodiment follows.
g) sort_by: flag denoting sort order of options in drop-down selection fields. 1=Alphabetical; 2=Sequence Number.
h) copy_to_child: flag denoting whether the value of this field should be copied to a child record. Possible values: 1/0.
i) pr_element_type: the id of the corresponding row in the PR_element type table. This column is used for FlexFields only. Points to: PR_element_type.id.
j) valid date type: used for Date and Date/Time fields. 0=Any Date; 1=Past Only; 2=Future Only.
k) is_table_driven: flag denoting whether the given field is table-driven. This column is used for Selection and Multi-Selection fields only. Possible values: 1/0.
l) highlight_changes: flag denoting whether the label of the given fields should be highlighted after the field value was modified at least once.
m) url: the value of a url for a web application. Used for Web Link fields.

n) param_name: the name of a parameter that will be passed to the url of a Web Link field.
o) is_masked: a flag denoting whether the value of a Web Link field should be masked. Possible values: 1/0.
p) parent_id: the id of a parent field. Used for Selection and Multi-Selection fields. Points to: Data_fields.id.
q) date_updated: the date and time this row was last updated.

Field_Class Values in a Preferred Embodiment::
SELECTION=1.
STRING=2.
NUMBER=3.
DECIMAL=4.
DATE=5.
DATETIME=6.
PERSON=7.
ENTITY=8.
LONG STRING (FlexField™)=9.
FILE POINTER=10.
FILE ATTACHMENT=11.
MULTI TEXT=12.
MULTI SELECT=13.
WEB APPLICATION LINK=14;

Graphical User Interface for Configuring Projects, User Groups, Group Types, and Form Templates: FIGS. 5-7, 9-14

In the following, the graphical user interface for configuring user groups, group types, and form templates will be described in detail.

Figure 5:
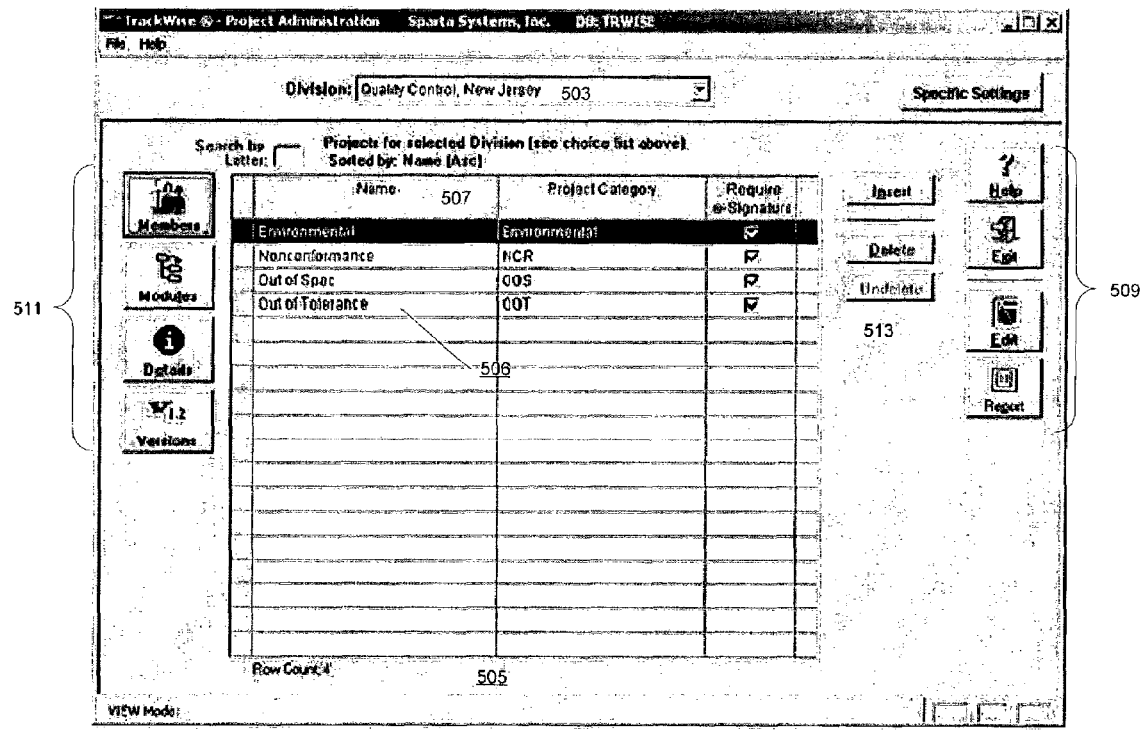
FIG. 5 is a screen that shows projects.
Figure 12:
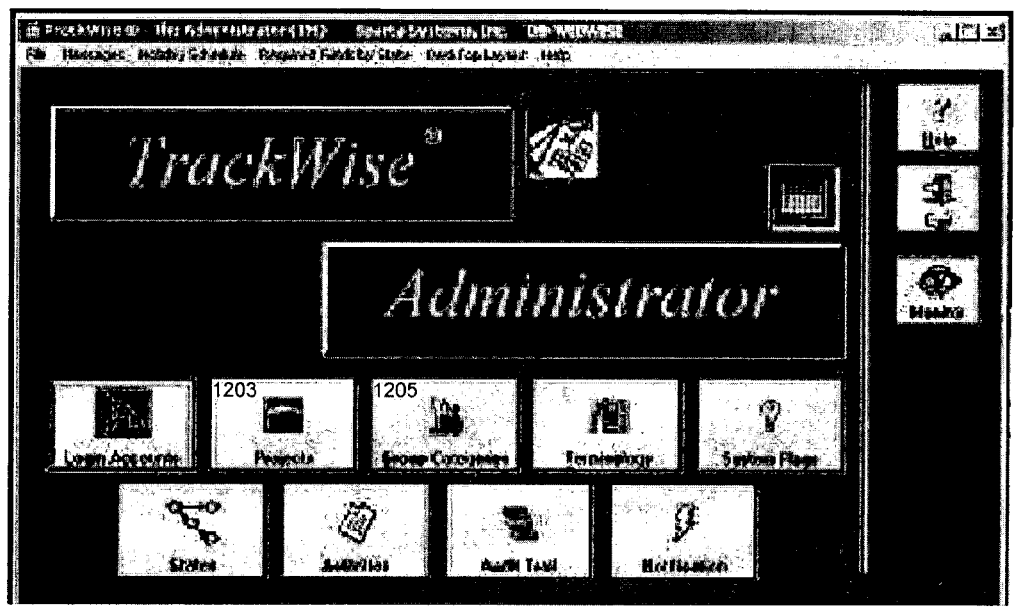
FIG. 12 is the top-level administrator screen for system 801.

GUI for Viewing and Configuring Projects: FIGS. 5 and 12

FIG. 12 shows the top-level screen 1201 which a user who is an administrator of system 801 uses to configure projects, group types, and system states. When the administrator pushes projects button 1203, screen 501, shown in FIG. 5, appears. Screen 501 is used to view and manipulate projects. The features of screen 501 are typical for the graphical user interface employed in system 801. Screen 501 has a field 503 that identifies a division; projects belonging to the division appear in list 505. Further divisions may be viewed by pressing the drop-down list button to the right of field 503.

Each project in the division has an entry 516 in list 505; the entry indicates at least the project's name 507. When a project is selected from the list, the entry is highlighted. The information in list 505 is obtained from project table 831. Buttons 511 include a members button for viewing a list of users that are members of the selected project; this list is made using project_member table 839. The details button is for viewing details concerning the selected project. Buttons 509 include a help button, an exit button for returning to the previous screen, an edit button for editing the selected project, and a report button for selecting reports to be generated about the selected project. The buttons at 513 permit the user to manipulate list 505, here, to insert an entry for a new project, delete an entry for an existing project, and undelete an entry. Insertion and deletion of entries results in insertion and deletion of rows in project table 831.

Figure 6:
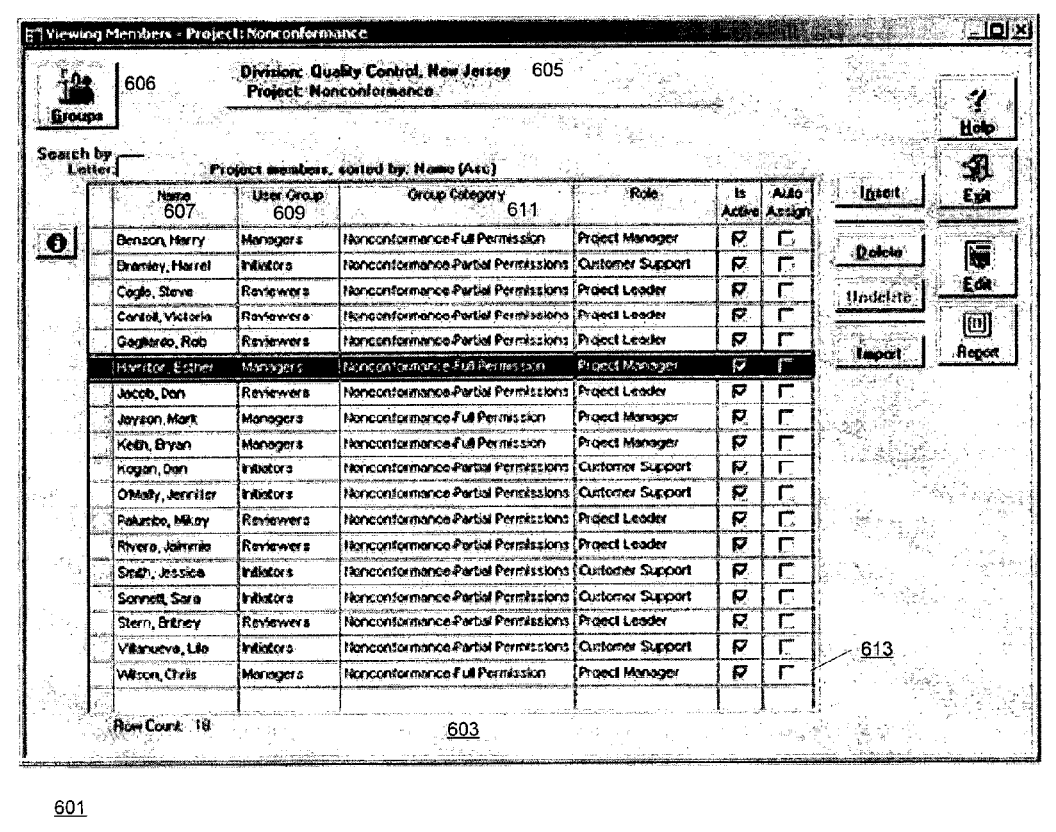

GUI for Viewing Project-Related Information about Project Members: FIG. 6

FIG. 6 shows the screen 601 that appears when the members button is pushed in screen 501. At the top of screen 601, the project's name and the name of its division are indicated at 605; at 603, there is a list of the members of the project indicated at 605; each member has an entry 613 in the list; in the entry are fields for the user's name (605), the user's user group in the project, and the user group's user group category (group type) (611). To see more information about user groups, the user pushes button 606. The information in this table is obtained by a query involving Person_relationship table 837, Project_member table 830, Group_member table 845, User_group table 843, and Group_type table 841. As before, the user may edit a selected entry 613 or insert and delete entries.

Figure 7:
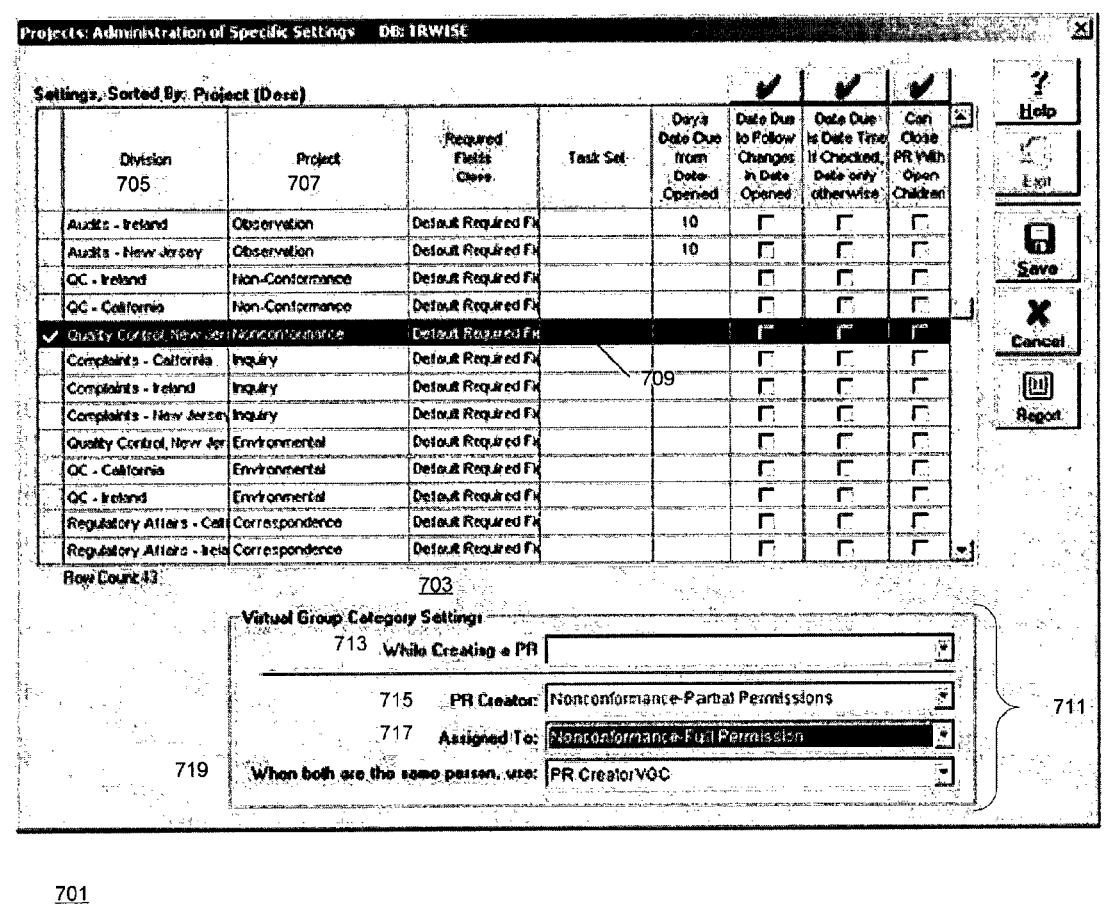

GUI for Relating Virtual User Groups to a Project: FIG. 7

FIG. 7 shows the GUI used in a preferred embodiment for specifying the virtual user groups that members of a project may be assigned to. Screen 701 is a screen that is used for general settings for a particular project. List 703 is a list of all the projects. There is an entry 709 for each project, with fields that show the project's division 705 and project name 707, as well as other information not relevant to the present discussion. When a particular project entry 709 is selected, subwindow 711 opens. The subwindow specifies the virtual user groups the project members may belong to. In the preferred embodiment, there are three virtual user groups that a project's members may belong to:

the virtual user group to which a project member belongs while he or she is creating a process record.
the virtual user group to which a project member belongs when the created_by_rel_id field of the process record the member has selected in screen 101 on contains the member's user ID; and
the virtual user group to which a project member belongs when the responsible_rel_id field of the process record the member has selected in screen 101 contains the member's user ID.

The GUI relates each of these virtual user groups to a group type. That is done at 711. The field at 713 does that for the first user group; the drop-down list there lists the group types, and the selected group type is the group type that applies when the user is creating the process record; similarly, the group type at 715 applies when a user is the creator of the process record and the group type selected at 717 applies when a user is the currently-responsible person for the process record. At 717, one of group types 715 and 717 is selected for the case when the user is both the creator and the currently responsible person.

In other embodiments, the virtual user groups can be named, and the interface would show the user group names. In other embodiments, the interface would further permit the user to associate group types with ranges of values of the field whose value determines the virtual user group membership. It should finally be noted that in other embodiments, the GUI for defining default user groups and the GUI for defining virtual user groups could be unified, with user group membership based on group member table 845 being simply treated as the default user group membership for determining the GUI. It would further be possible to specify a user group membership defined in any fashion as the default user group membership.

GUI for Defining Group Types: FIGS. 9-12

Pushing group categories button 1205 in top-level administrator screen 1201 results in the display of Group Categories screen 901. Screen 901 is the starting point for creating or deleting a group type, setting general permissions for the group type, setting permissions for the fields that may appear in the group type's configurable form 109, and making and editing the form template file 855(i) that system 801 uses to make configurable form 109. Screen 901 includes list 903 of the user group categories presently defined for system 801. Each user group category has an entry in table 903, and the entry contains the group type's name 907 and its abbreviated name 909. This information comes from the entry in Group_type table 841 for each user group. Buttons of interest in the present context include permissions button 911, which gives access to the screen used to set permissions for a group type and ConfigForms button 913, which gives access to the screen used to configure configurable form 109.

FIG. 10 shows the screen 1001 when the user selects an entry in list 903 and clicks on permissions button 911 in screen 901. Screen 1001 has two major parts: overall permissions selection portion 1005 and data field permissions portion 1003. Overall permissions selection portion 1005 permits the user to specify which permissions members of user groups associated with the group type have with regard to the entire process record. The permissions include permission to open a process record, to reopen a closed process record, to create children of a process record, to assign or reassign a process record to a user of system 801, and to post activities with regard to the process record. To grant a permission, the user checks the relevant box. The results of these actions are recorded in the group type's entry in PR_permissions table 847.

Field permissions part 1003 is a list of the fields defined in data_fields table 834. Each field has an entry 1006 in list 1003. When the user sets at least the Can View permission for a field, the field becomes available for inclusion in the configurable form 109 for the group type. If the Can Edit permission is selected as well, the field will be writeable in configurable form 109. There are three items shown in the entry: the field's name 1007, its data type 1009, and permissions 1011. The information shown at 1007 and 119 is from data_fields table 834; When set, the permissions go into the entry for the data field and group type in Group_fields table 849.

FIG. 11 shows the screen 1101 which appears when the user clicks on the ConfigForms button 913 in screen 901. List 1103 has an entry for each group type. Each entry has the group type's name 1105 and the name 1107 of the form template file 855(i) associated with the group type. Information in this list comes from group type table 841, and modifications of the list result in modifications of the corresponding records in group type table 841. To configure a configurable form 109, the user selects an entry in list 1103 and then clicks on FormEdit button 1109.

Figure 13:
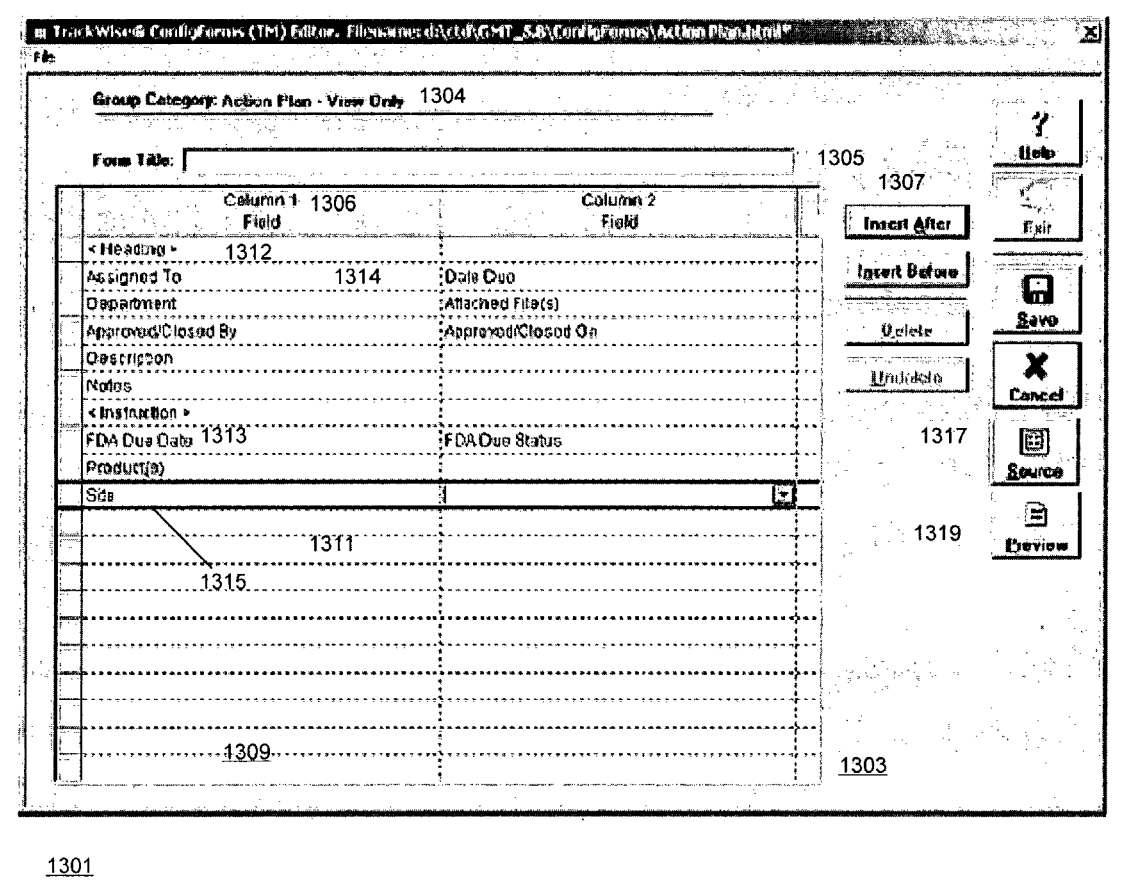
Figure 14:
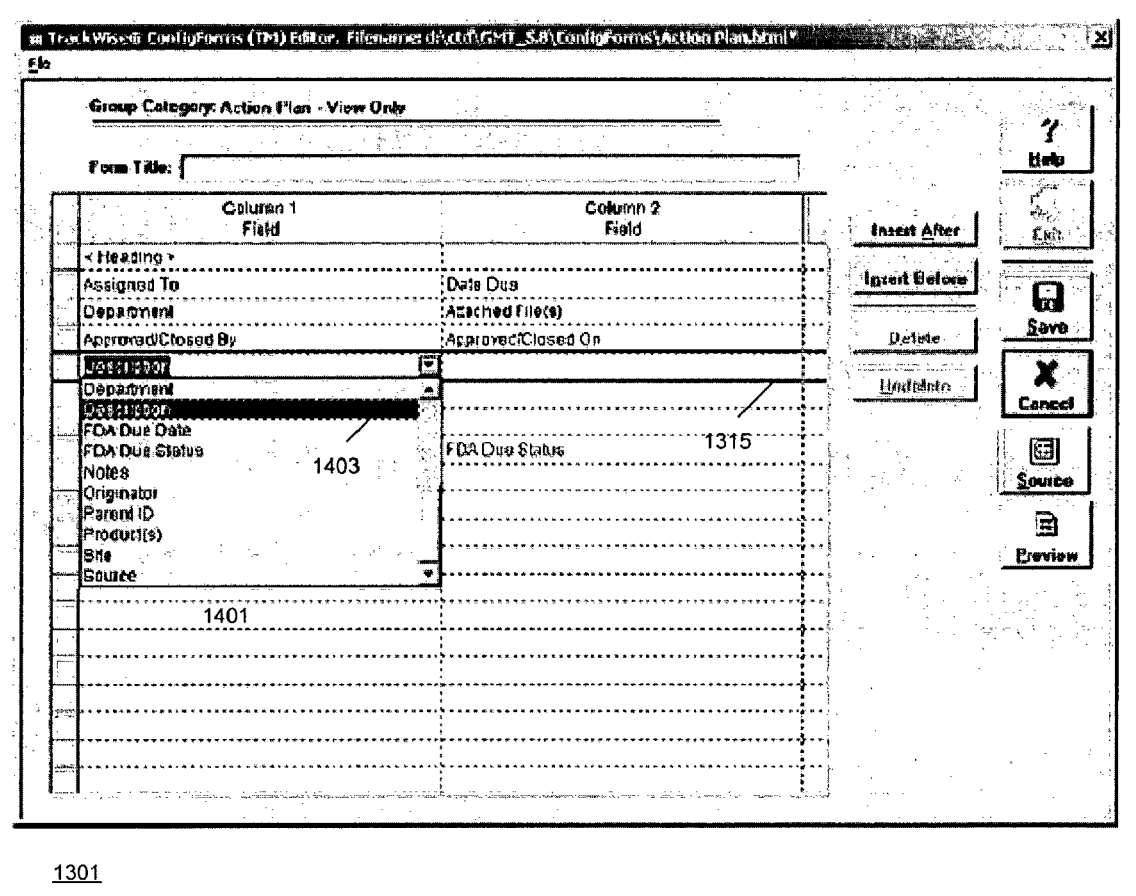

FIG. 13 shows the screen 1301 that appears when the user clicks on FormEdit button 1109. The main portion of the screen is array of configurable form fields 1303. The array has as many columns 1306 as the user desires in configurable form 109; in this case, two columns. Each entry 1313 in a column specifies the position of a potential field in configurable form 109. When a user selects a field in a column, as shown at 1315, a drop down menu appears. The menu is shown at 1401 in FIG. 14. There is an entry 1403 in drop down menu 1401 for each field that is to be included in configurable form 109, as determined from Group_fields table 849. When the user selects a process record, the corresponding field in configurable form 109 will give the user access to the specified fields. The fields may of course be either in the process record or in records in PR_related tables 836 that are related to the process record. When the user selects a field in array 1303, the field's name appears the selected field.

Continuing with further details of the form, in addition to selecting a field in the process record as the content of a field in the configurable form, the user may specify text as the field content; that is done by selecting fields with built-in names such as <heading>, as shown at 1312, or <instructions>. With these built-in names, selection of the built-in name in the drop-down menu opens a window for entry of the text that will appear at the position of the field in configurable form 109. The entered text becomes part of template file 855(i).

The group type the form belongs to is indicated at 1304; at 1305, the user may enter a title which will appear on configurable form 109. The user may employ the buttons at 1307 to change the positions of the fields in the configurable form. If the user clicks on button 1317, he or she will see the HTML for the template file 855(i) that will be produced from the information in screen 1301 as it presently stands and if the user clicks on button 1319, he or she will see the configurable form 109 that will be produced from template file 855(i) made from screen 1301 as it currently stands.

Figure 15:
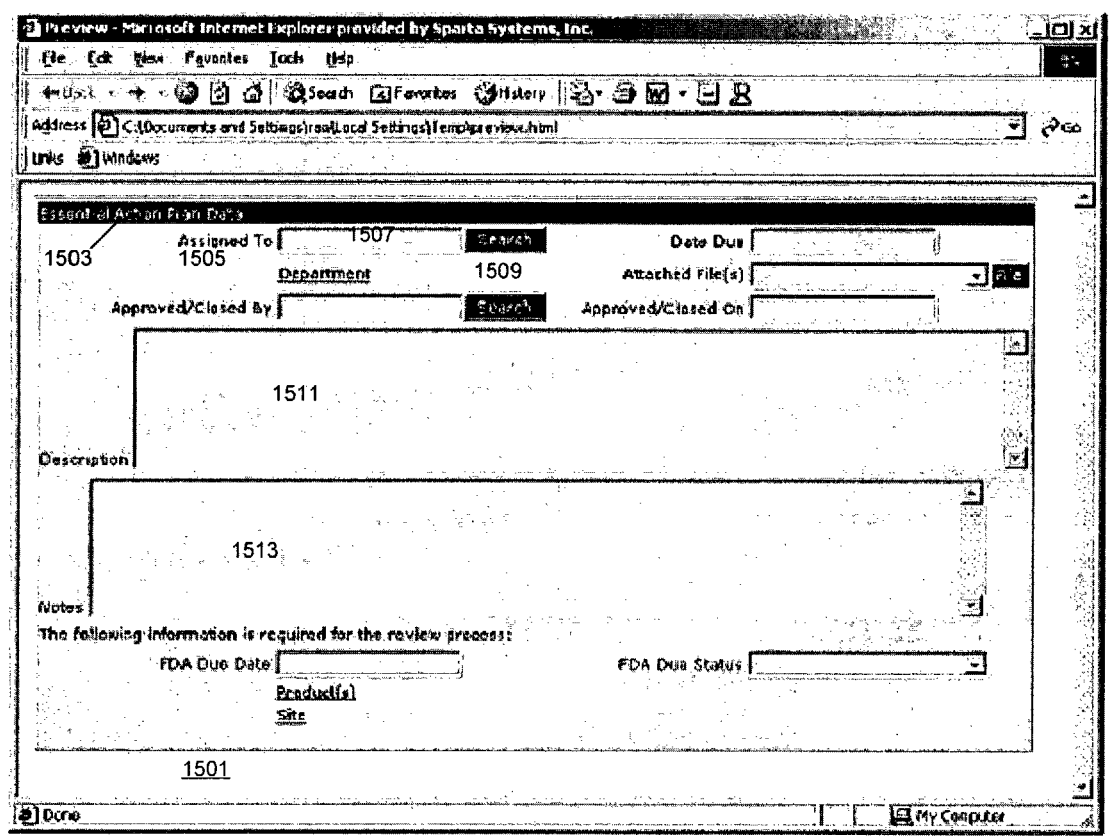
FIG. 15 is a screen showing the configurable form produced from the screen of FIG. 13.

FIG. 15 shows the configurable form 1501 that is produced from the configuration specified in window 1301. The text specified for <heading> field 1312 appears at 1503; field 1314 of FIG. 13 becomes features 1505-1509 in the configurable form. At 1505 appears the label specified in field 1314; at 1507 appears a field to read or enter a value for a variable in the process record, in this case, responsible_rel_id, which contains the user ID for the person responsible for the process that corresponds to the process record. Of particular interest here is that form template interpreter 820 associates a search button 1509 with field 1507. The user filling out form 1501 can either enter the name of the person who is to be responsible or use button 1509 to cause a search window to appear which allows the user to search among all of the users of system 801. Form template interpreter 820 has been programmed to associate the search button with any data field whose entry in data_fields table 834 indicates that the data field has the PERSON type. Fields such as description field 1511 or notes field 1513 that do not appear in the process record are in related records in PR_related tables 836.

Figure 18:
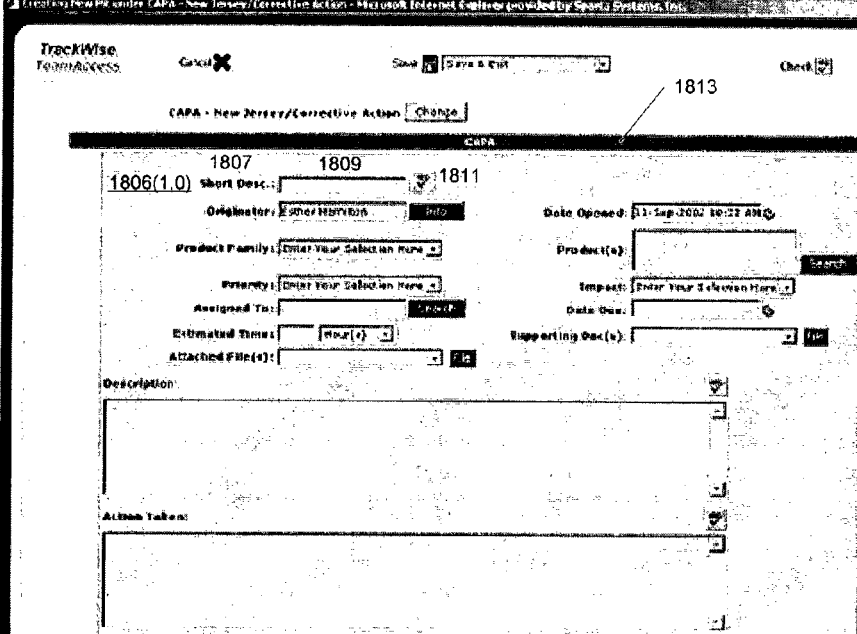
FIG. 18 shows the configurable form resulting from the HTML page made by the form template interpreter.

Examples of a Form Template File 855, the HTML Document Produced from it, and the Screen Produced from the Html Document: FIGS. 16-18

FIG. 16 shows a portion 1601 of a form template file 8550) produced by form template compiler 818. Form template interpreter 820 will use portion 1601 to produce a portion of the HTML from which the user's browser produces screen 1801 shown in FIG. 18. Screen 1801 has as its basic structure a table that has a header 1813, two columns 1803(0) and 1803(1), and a number of rows 1805. Each row is made up of two cells; one such cell, 1806(1,0), which is the first cell of the second row, is identified in FIG. 18. As will be recalled from the discussion of FIG. 13, each of the columns in FIG. 18 corresponds to a column defined in the screen 1301 used to configure form, each row corresponds to a row in that form, and a cell corresponds to the field at the intersection of a row and cell. The portion 1601 of form template file 855 for screen 1801 that we are concerned with specifies header 1813 and the cells of rows 1805(0 . . . 2).

Turning again to portion 1601, as will be apparent to those skilled in the relevant arts, form template file 855 is written in standard HTML. The HTML for header 1813 appears at 1603, with the actual characters for the title being at 1605. When configuring the configurable form template file, the user enters the characters for the title in field 1305. The remainder of the HTML in portion 1601 is the HTML for rows 1805(0 . . . 2). The HTML 1609(i) corresponding to each row 1805(0 . . . 2) includes HTML for at least one cell. The HTML corresponding to a cell 1805(i,j) is designated as 1607(i,j). Thus, the HTML for row 0 is shown at 1609(0) and HTML 1607(0,0) is the HTML for cell 1806(0,0), which is empty.

The cell with which we will be concerned in detail is cell 1607(1,0), which corresponds to cell 1806(1,0). Cell 1806(1, 0) contains a field 1809 in which a short description of the process represented by the process record may be entered, as well as a label 1807 for the field and a button 1811 for a spell checker. The short description field corresponds to the name field in the PR record. All of the information needed to make cell 1806(1,0) other than the cell's position in screen 1801 is either obtained from or based on information obtained by system 801 from tables in database system 825 when a user selects a process record 103 from screen 101. Consequently, the information cannot be directly represented in form template file 855 when the form template file is made; instead, it is represented by special tags 219. Two of these special tags appear in boldface in cell 1607(1,0) The first of them, <%0%> 1611, represents the name of the field as specified in screen 1301; the second of them, <% dfo %> 1613, represents the information from Group_fields table 849 and Data_fields table 834 that is needed to make the field in the configurable HTML form. In a preferred embodiment, the value in a special tag 219 is the ID of the entry for the data field in Data_fields table 834.

FIG. 17 shows how form template interpreter 820 translates special tags 219 into the HTML needed to produce the field represented by the special tags. The cell in the HTML for the configurable form that is produced from the template file that contains cell 1617(1,0) is shown at 1701(1,0) in FIG. 17. The HTML that results from the translations of the special tags 1611 and 1613 is in bold face. The bold-faced HTML at 1703 results from the translation of tag <% 0%> 1611; HTML 1703 will produce label 1807 when the browser displays the configurable form. Bold faced HTML 1705 results from the translation of tag <% dfo %> 1611; at 1707 the HTML specifies that the field will have the text type and will be writeable; the type information comes from Data_fields table 834; the information that the field is writeable comes from the permissions for the field in Group_fields table 849. Next comes the name 1709 of the field in the process record that contains it, again from Data_fields table 834, and its default value 1711. Here, the field name is the user-defined name for the name field in the process record. Since the field is an input field, there must be an event handler that responds when the field's value is changed; that is specified at 1713; finally, because the field is a text field, form template interpreter 820 supplies the specification for the spell checker and its button 1811. When all of the HTML specified in cell 1701(1,0) is executed, what appears in configurable form 1801 is corresponding cell 1806 (1,0).

The techniques that have just been described can be used to do the following:
- define a user group of users in terms of values of fields in database system 825 at the time the user performs a particular operation;
- associate any defined user group of users with a set of data fields contained in objects in database system 825;
- associate users belonging to the user group with permissions concerning those fields;
- associate users belonging to the user group with a template for a configurable HTML form;
- easily configure the template; and
- at the time a user performs the operation, produce the configurable form required by the user's current user group membership from the template using the current permission information and other current information obtained from the database system about the data fields associated with the user's current user group.

The problem of keeping the HTML used to generate the configurable form current with the states of the objects in database system 825 is enormously simplified by the use of special tags to describe fields in the template. These special tags are then resolved at run time to produce HTML for fields in the configurable form that accurately reflect the current state of database system 825.

New User Access Permissions

In the process control system described in the parent of the present application, a user's access permissions with regard to process records 833 were decided by his project membership; a member of a project could view any process record for the project. A user's access permissions with regard to user-configurable data fields were determined by the group category of the user group the user belonged to. A given group category could be given no access at all to a field, Can Edit access, which gave a user who was a member of a user group belonging to the group category the full ability to modify the field's value, including giving a field that has a null value a value and setting a field whose value is non-null to null, and Can View access, which merely permitted the user to view the current value of the field. Experience with these access permissions revealed that they did not have sufficient granularity for the needs of some users of the process control system, and that with regard to access to user-configurable data fields, the existing user permissions did not distinguish between being able to edit an existing value and adding and deleting values and because they did not make this distinction, did not provide sufficient support for the audit trail requirements imposed on the pharmaceutical industry by 21 CFR Part 11.

To deal with these difficulties, viewing permissions for process records 833 have been added which limit viewing of process records for a project to members of the user group that created the process record, to the user that created the process record, to the user to whom the process record has been assigned, or to users that are related to an entity that the process record is related to. Moreover, permissions have been added for user-configured fields which give a user who belongs to a group with the proper group type the ability to insert a value into a user-defined field or delete a value from a user-defined field without giving the user the ability to modify an existing field.

User Access Permissions for PR Records 833

Figure 19:
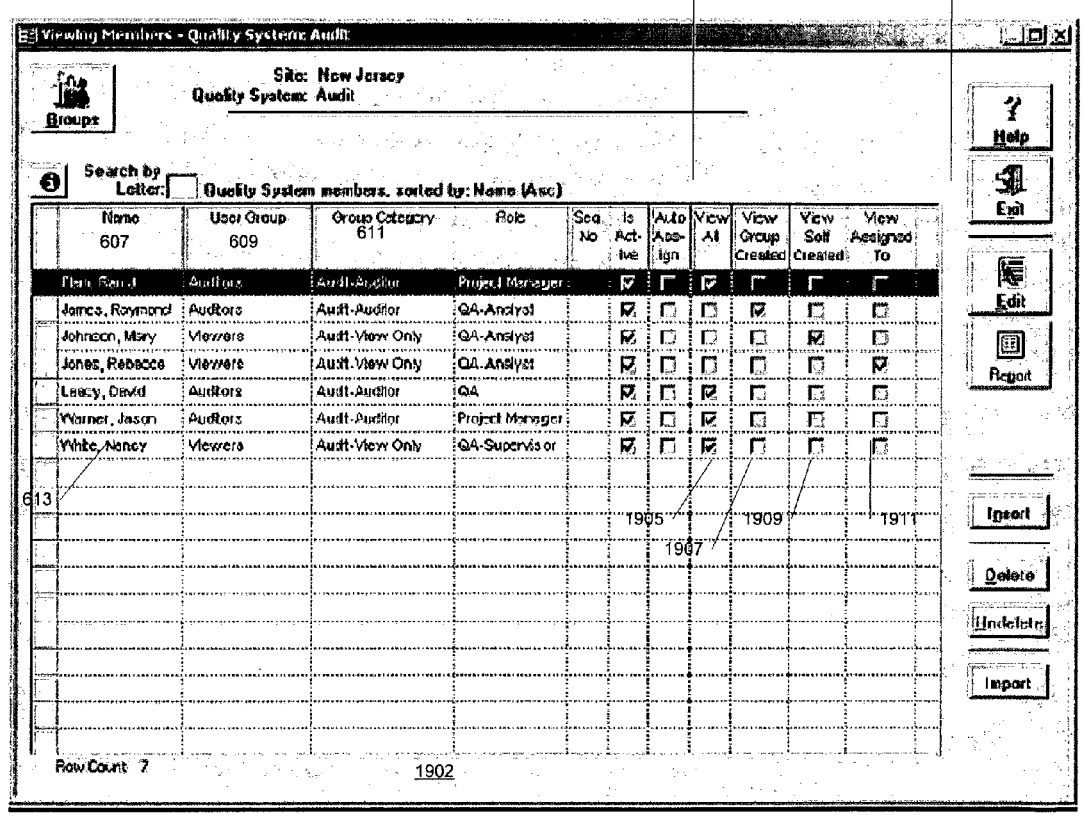
FIG. 19 is a window showing the GUI for setting user access permissions for process records.
Figure 21:
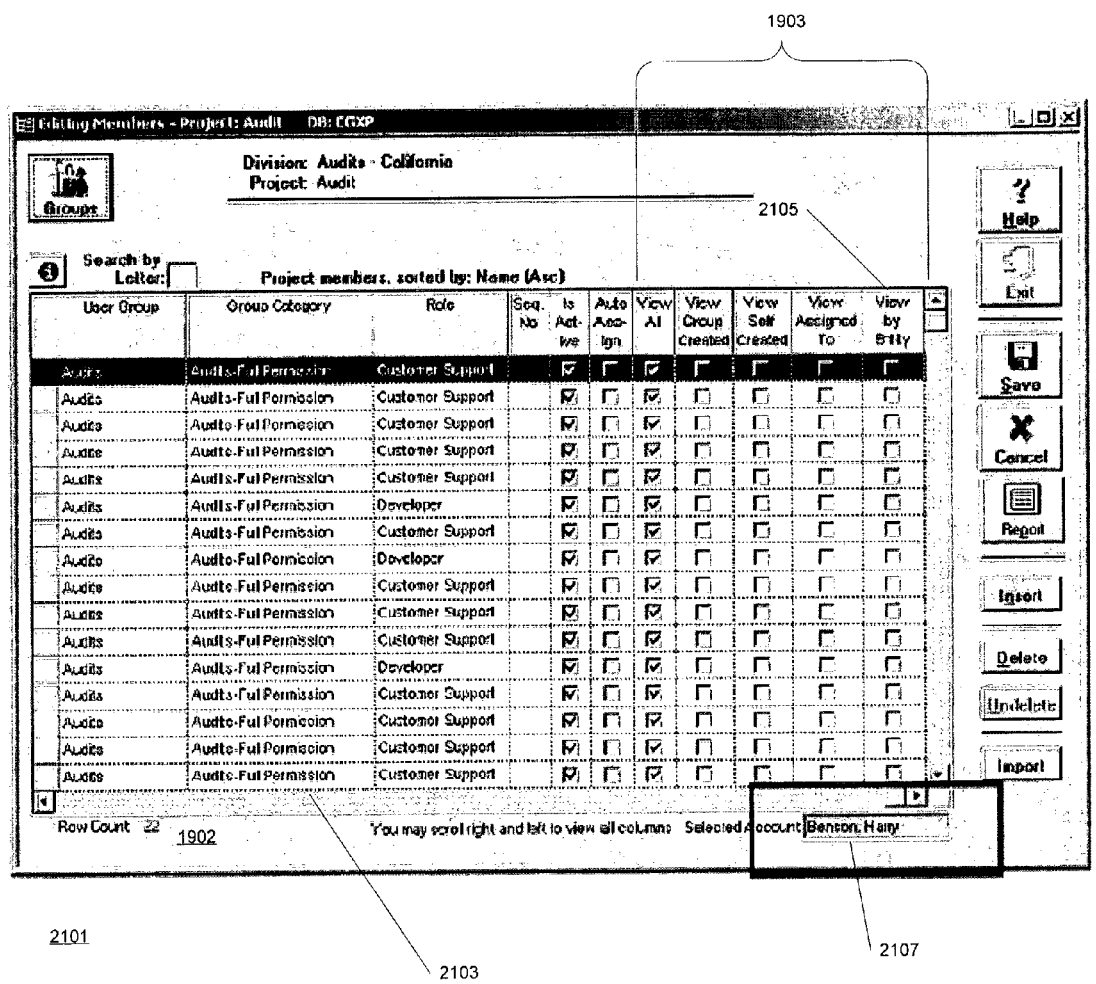
FIG. 21 is another window showing the GUI for setting user access permissions for process records.

Overview: FIGS. 6, 19, and 21

FIG. 6 shows window 601 that was used in the parent to show and modify the relationships between project members and process records. Every project member may view every process record belonging to a project, and consequently, the window provides no means of controlling which project members may view a record. FIGS. 19 and 21 show the corresponding window with check boxes for the new user access permissions. As in FIG. 6, table 1902 in window 1901 has a row 613 for every user that belongs to the project Quality System. Added to table 1902 are columns 1903, one for each of the new user access permissions. Visible in FIG. 19 are column 1905 for the View All permission, column 1907 for the View Group Created permission, column 1909 for the View Self Created permission, and column 1911 is for the View Assigned To permission. The column for the View Entity permission is off to the right in FIG. 19; it may be seen in FIG. 21. FIG. 21 shows window 2101, which is a variation of window 1901. Window 2101 also shows table 1902, but it includes horizontal and vertical scrollbars 2103 to permit viewing of columns that are to the left or the right of the current position of window 2101 in table 1902 as well as rows that are above or below the current position of window 2101. The scroll bars are set so that the rightmost column in columns 1903, column 2105 for the View Entity permission is visible. The field at 2107 keeps track of the name of the user to which the currently-selected row in table 1902 belongs. To give a project member a permission, an administrator who has the permissions required to modify the user permissions checks the check box for the permission in the project member's row.

The meanings of the new permissions are the following:
1) Can View PRs Created by User Group: with this permission, a Project Member is granted access to all PRs which were created by his/her User Group in the given Project, including PRs that the Project Member has created, since he/she are a member of their own User Group.
2) Can View PRs Created by User: with this permission, a Project Member is granted access to all PRs which were created by himself/herself. This is a sub-permission of the Can View PRs Created by User Group permission. That is, if a Member of a given Project is granted access permissions as defined in (a) above, then the Can View PRs Created by User is assumed by definition.
3) Can View PRs Assigned to User: with this permission, a Project Member is granted access to all PRs which were have been assigned to him/her. This is a permission which is independent of any of the above permissions. That is, a user can access PRs in a given Project, even if such PRs were created by another User group or another user, provided that such PRs are assigned to him/her.
4) Can view PRs for an entity to which the user is related: with this permission, a Project Member is granted access to all PRs which are related to an entity to which the user is related. This is a permission which is independent of any of the foregoing permissions. That is, a user can access PRs in a given Project, even if such PRs were created by another User group or another user, provided that such PRs are related to an entity to which the user is related.
5) Can View all PRs: with this permission, a Project Member is granted access to all PRs in the given Project.

The above semantics are reflected in the behavior of the checkboxes in a preferred embodiment. If the administrator checks View All 1905 for a user, the GUI will not permit him or her to select any other permissions for the user; if the administrator checks either View Group Created 1907 or View Self Created 1909, he or she is not permitted to select the other. View Assigned To 1911 or View Entity may be checked regardless of whether View Group Created or View Self Created has been checked.

The following examples shows the benefits of these new permissions. For purposes of the first example, the project of interest is "Deviations", and the User Groups of interest are: "Production Staff—Plant A", "Production Staff—Plant B", "QA", and "Management". If standard procedures require that members of "Production Staff—Plant A" should have access only to PRs created by their User Group, they will be granted permission (a) as defined above; further, if such procedures require that members of "Production Staff—Plant B" can see only PRs that each of them have created individually, such users will be granted permission (b) as defined above; further, if "QA" should have access only to PRs assigned to them, they will be granted permission (c) as defined above; and finally, if members of "Management" should have access to all PRs in the given Project, they will be granted permission (d) as defined above.

The second example shows the benefits of View Entity. If a business that is using Trackwise has vendors or contract manufacturers that it wants to let log into the business's TrackWise system and access a particular project, say a project called Vendor Audits that audits TrackWise transactions involving suppliers or vendors. The business can create a Vendor Audits project in TrackWise and can use the entity_id field in the PR record to relate the supplier/vendor to the PR record. Then, when View Entity permission has been given to an individual who belongs to a project and is related to a particular entity, the individual can view PR records that are related to the project and the entity. Therefore, if Cardinal Health and Boehringer-Ingelheim are both contract manufacturers for the business that is using TrackWise and members of those organizations have been made members of the Vendor Audits project, have been related to their organizations, and have been given View Entity permission, the members of each of these organizations can only see PR records for their organization and not those for other organizations. Without the View Entity permission, a separate project would be required for each contract manufacturer. Another use of View Entity is to have the Entity specify a particular site in the business that is using TrackWise and then use View Entity to restrict the PR records that users at the site can see to those PR records that are related to the site by virtue of their entity_id field.

Implementation Details

Implementing the permissions involves adding fields for the permissions to Project_member table 839, adding code to queries of PR table 833 that checks what access permissions the user has to the PR records and restricting the information it returns to the user accordingly, and modifying the query that produces window 601 so that it produces window 1901 showing the new permissions.

As modified to accommodate the new permissions, Project_member table 839 is defined like this:

```
CREATE TABLE Project_member (
id NUMBER(12) NOT NULL,
project_id NUMBER(12) NOT NULL,
person_relation_id NUMBER(12) NOT NULL,
person_role_type NUMBER(6) NOT NULL,
date_start DATE NOT NULL,
date_end DATE,
is_active NUMBER(1),
auto_assigned_to NUMBER(2),
view_group_created NUMBER(2),
view_self_created NUMBER(2),
view_assigned_to NUMBER(2),
view_entity NUMBER(2),
view_all NUMBER(2),
date_updated DATE NOT NULL,
primary key(id)
)
```

As now implemented, a record in Project_member table 839 contains the following data fields:
(a) id: a unique ID of the record in this table,
(b) project_id: an ID of a record in the Project table, identifying a Project for which access is granted,
(c) person_relation id: an ID of a user for which Project Membership is granted,
(d) date_start: date/time that Project Membership was granted,
(e) date_end: date/time that Project Membership was terminated,
(f) is_active: TRUE=1, FALSE=0, indicating whether given Project Membership defines an "active" member, or a "passive" member; PRs and PR Activities can be assigned only to "active" Project Members,
(g) auto_assigned_to: TRUE=1, FALSE=0, indicating whether the given Project Member, as per person_relation_id, will be automatically assigned to new PRs created in the given Project, (h) view_group_created: TRUE=1, FALSE=0, indicating whether the given Project Member, as per person_relation_id, can view all PRs created by his/her User Group,
(i) view_self_created: TRUE=1, FALSE=0, indicating whether the given Project Member, as per person_relation_id, can view only PRs created by himself/herself,
j) view_assigned_to: TRUE=1, FALSE=0, indicating whether the given Project Member, as per person_relation_id, can view PRs assigned to him/her, in addition to the above possible permissions,
(k) view_entity: TRUE=1, FALSE=0, indicating whether the given Project Member, can view PRs that specify an entity to which the Project Member is related, in addition to the above possible permissions,
(l) view_all: TRUE=1, FALSE=0, indicating whether the given Project Member, as per person_relation_id, can view all PRs created in the given Project,
(m) date_updated: the date and time that this record was last updated.

The information needed to determine whether the user is the originator of a PR record is obtained from the created_by_rel_id field of the PR record; the information needed to determine whether the user is currently assigned to the PR record is obtained from the responsible_rel_id field; the information needed to determine whether the user is a member of the user group that created the record is contained in user_group_id of the PR record. That field is not shown in the description of the PR record in the parent of the present application. user_group_id contains the identifier of the record in User_group table 843 for the user group to which the user belonged who created the process record.

For View Entity, the information needed to determine the entity a user is related to is obtained by applying the ID of the user's record in Person_relation table 837 to an Entity table (not shown in FIG. 8) which has a row for each user/entity combination to obtain the identifier for that row in the Entity table. If the identifier for the row matches the value of the entity_id field in the PR record, the PR record and the user relate to the same project, and the user has View Entity permission, the user may view the PR record.

The SQL condition that is added to queries of the PR table to check access looks like this in a preferred embodiment:

```
. . . AND
PR.id IN(
SELECT
PR.id
FROM
PR, Project_member, Group_member
WHERE
Project_member.project_id=PR.project_parent_id AND
Group_member.project_member_id=Project_member.id
    AND
Project_member.person_relation_id=:gnUserRelId AND
(
    (Project_member.view_all=1) OR
    (Project_member.view_self_created=1 and
        PR.created_by_rel_id=:gnUserRelId) OR
    (Project_member.view_assigned_to =1 and
        PR.responsible_rel_id=:gnUserRelId) OR
    (Project_member.view_by_entiy=1 and
        PR.entity_id=:gnEntityId) OR
    (Project_member.view_group_created=1 and
        PR.user_group_id=Group_member.user_group_id)
)
)
```

Additional Field Permissions

An important element of the configurability of TrackWise is the user-defined field. Process records in PR table 833 may include fields that are defined by the user. The definitions for these user-defined fields are records in Data_fields 834. The records for this field have already been explained. As explained in the parent of the present application, records in Data_fields 834 originally had two permissions: Can View and Can Edit. That is, every data field defined in the system, a standard field, or a user-defined field, could be specified as: visible only (no edit permissions); visible and editable; or invisible (in which case, editability is not applicable). These field permissions are specified on a per Group Category level. A user that belongs to a group that in turn belongs to a particular group category will have the permissions with regard to a given user-defined field that are specified for the group category of the user's group. Thus, for example, Group Category "CA Full Permissions" may be assigned view/edit permissions to all data fields, while Group Category "CA Partial Permissions" may be assigned view permissions to all data fields, but may be given edit permissions only for certain fields.

The fact that only Can Edit and Can View field permissions were available resulted in certain limitations. Most notably, there was no distinction between giving a field a value that had previously had a null value one or giving a field a null value that had previously had a non-null value and changing the non-null value. All three actions were permitted to the user whose user group belonged to a group category that had Can Edit permission with regard to the field. There are, however, situations where certain users should be allowed to capture initial data, but not be allowed to change it. Similarly, there are situations where a person should be able to change a field's value, but not delete the value. To provide for the need to separate the permission to edit from the permission to insert a value where there was none or delete a value where there was one, two additional field permissions have been defined for TrackWise:

1) Can Insert: the user may add a value to a data field but may not modify existing values in the field.
   a) in the case of data fields that may have only a single value, Can Insert permits the user to insert a value into a field if the field currently has a null value but does not permit the user to modify a nun-null value in the field; and
   b) in the case of data fields where the data field's value may be one or more values selected by users from a list of possible values for the data field, Can Insert permits the user to add another value from the list to the data field's current value, but not to change the values already in the current value.
2) Can Delete: the user may delete an existing value from a data field but may not otherwise modify the existing values.
   a) in the case of data fields that may have only a single value, Can Delete permits the user to replace the value with a null value, but not to otherwise modify it.
   b) in the case of data vields where the data field's values may be one or more values selected by users from a list of possible values for the data field, Can Delete permits the user to remove a value from the data field's current value, but not to otherwise change the values in the current value.

The these two new field permissions deal with situations where once a value has been given to a field, no further editing should be allowed. One such situation arises in environments which are subject to 21 CFR Part 11 regulation. When the value of a user-defined field is a file name for a file that contains a document, the Trackwise system cannot track changes in the document. Consequently, a set of permissions are required which permit the file name to be inserted into the field and thereby attach the document to a Trackwise record containing the user-defined field, but do not allow any editing of the document. Similarly, there are situations where once a document has been attached, it should not be removed. These new field permissions also address situations where users are required to keep revision histories of attached documents. In such a situation, the user-defined field that the permissions apply to has as its value a list of one or more file names. When a user revises document, the user must make a copy of the current attached document with a different file name, revise the copy, and then add the file name for the revised copy to the file names in the field. This ensures that the initial attachment from which the copy was made, was neither overwritten nor its contents changed. This can be accomplished where the field permissions are set as follows: Can Insert=Y, Can Edit=N, Can Delete=N. This permits a user to add the latest revision to the list, but prevents the user from removing or editing any version.

Implementation Details

The implementation adds two new columns to the Group_fields table of the parent of the present application. The new columns are can_insert and can_delete. The Group Permissions GUI shown at 1001 in FIG. 10 of the parent has also been modified to permit users with the proper administrative permissions to set the two new field permissions. While the new Can Insert and Can Delete permissions can be applied to a user-defined field having any field type, the initial implementation limits the application of these permissions to fields having the File Attachment field type only. That is, field types such as Number, Decimal, String, etc. will not be affected by these new field permissions (they will continue and be handled by the existing Can View and Can Edit permissions).

Figure 20:
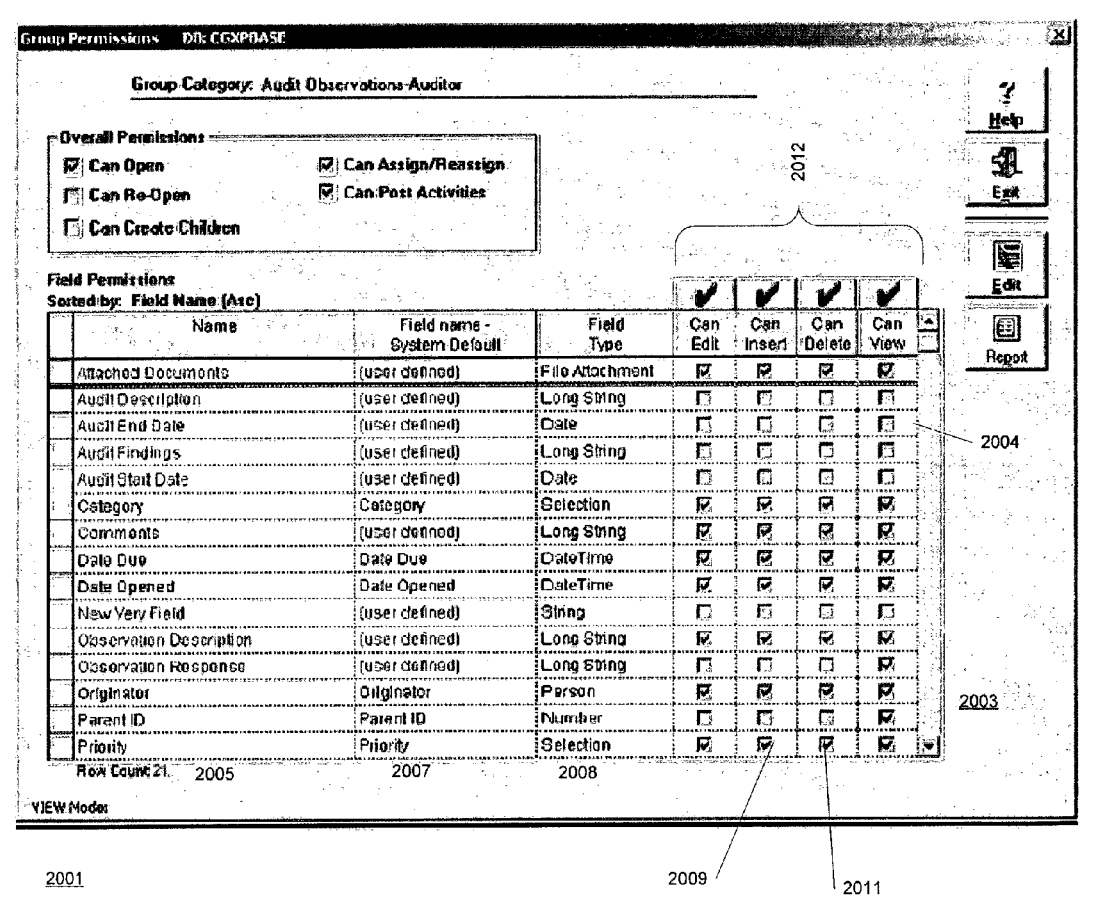

The semantics of the permissions for user-defined fields having the File Attachment type are now as follows:
 1. Can Insert—can attach a document with a new file name to the field
 2. Can Edit—can modify an existing attachment, which means that an existing attachment can be opened and edited by an authoring applications, e.g., MS Word, and when the changes are saved, the contents of the attachment will change accordingly
 3. Can Delete—can remove an existing attachment Changes to the Group Permissions GUI: FIG. 20

Code will be added to the Group Permissions screen to allow the handling of the two new Can Insert and Can Delete permissions. The new GUI appears in window 2001 in FIG. 20. As before, the window shows the permissions for a particular group category. Table 2003 lists the names of the user-defined fields in columns 2005 and 2007, their field types in column 2008, and the permissions at 2012. The new Can Insert permission is shown at 2009 and the new Can Delete permission is shown at 2011. As before, check boxes in the rows for the user-defined fields are set to set the permissions. At present code associated with GUI 2001 limits the application of the two new field permissions to user-defined fields having the File Attachment field type only. For all other field types, these permissions will automatically follow that of the Can Edit permission Changes to the Group_Fields Table The table Group_fields 849 of the parent has been modified to include two new columns: can_insert, and can_delete. The revised Group_fields is shown as follows:

Group_Fields (Revised Table):
 CREATE TABLE Group_fields (
 id NUMBER(12) NOT NULL,
 group_type NUMBER(6) NOT NULL,
 field_id NUMBER(12),
 can_edit NUMBER(2),
 can_insert NUMBER(2),
 can_delete NUMBER(2),
 can_view NUMBER(2),
 date_updated DATE NOT NULL,
 primary key(id)

Explanation:
 This table contains the following data fields:
 (n) id: a unique ID in this table,
 (o) group_type: an ID of a record in the Group_type table, identifying a Group Category, whose field permissions are defined by the given row in the Group_fields table,
 (p) field_id: an ID of a record in the Data_fields table, identifying a Data Field, whose permissions are defined by the given row in the Group_fields table,
 (q) can_view: TRUE=1, FALSE=0, indicating whether the field specified by field_id can be viewed, i.e., is visible by users who have Group Category specified by group_type,
 (r) can_edit: TRUE=1, FALSE=0, indicating whether the field specified by field_id can be edited by users who have Group Category specified by group_type,
 (s) can_insert: TRUE=1, FALSE=0, indicating whether the field specified by field_id can be inserted into by users who have Group Category specified by group_type,
 (t) can_delete: TRUE=1, FALSE=0, indicating whether the field specified by field_id can be deleted by users who have Group Category specified by group_type,
 (u) date_updated: the date and time that this record was last updated.

As was the case with can_edit and can_view, whenever a user alters a value of a user-configurable field in a PR record 833 or record of another table which includes a user-configurable field, database system 825 executes code in response to such an alteration that examines the Group_fields table to determine whether the user has the permission necessary for the alteration. If the user does not have permission, the alteration is not made to the field.

CONCLUSION

The foregoing Detailed Description has disclosed to those skilled in the relevant technologies how to implement user access permissions for process records and the insert and delete permissions for user-configurable data fields and has further disclosed the best mode presently known to the inventors for implementing user access permissions for process records and the insert and delete permissions for user-configurable data fields. It will be immediately apparent to those skilled in the relevant technologies that many implementations of the inventions other than the ones disclosed herein are possible. For example, what is important for the user access permissions is that the user and the process-related record are related to each other and the user is associated with a permission value; the actual arrangement of tables in the database system that provide the relationships may very from embodiment to embodiment. The same is true with regard to the relationship between user-configurable fields and group types and the association of the insert and delete permissions with field and group type pairs.

It should further be noted that the inventions are implemented in an existing process control system and that the manner in which the inventions are implemented is strongly determined both by the fact that the system the inventions are implemented in is a process control system and by the need to integrate the implementation of the inventions into the existing system. Implementations of the inventions in other systems will similarly reflect the systems they are implemented in.

For all of the foregoing reasons, the Detailed Description is thus to be regarded as being in all respects exemplary and not restrictive, and the breadth of the invention disclosed herein is to be determined not from the Detailed Description, but rather from the claims as interpreted with the full breadth permitted by the patent laws.

What is claimed is:

1. A process control system that includes a processor and a data storage device accessible to the processor, the processor executing a relational database system that has tables stored in the storage device and the process control system comprising:
   tables in the relational database system that
   relate a set of process-related records that are used to control processes to a set of users of the process control system, a particular user having one or more relationships to a particular process-related record, a relationship of the relationships being specified by a value in the particular process-related record, and that
   relate users of the set of users to one or more permissions, each permission permitting a user who has a particular relationship to a particular process-related record to view the particular process related record;
   the process control system permitting the particular user to view the particular process-related record only if there is a combination of the permissions related to the particular user and the relationships which the particular user has with the particular process-related record such that the particular user is permitted to view the particular process-related record,
   the one or more particular relationships by which a particular user is relatable to a particular process-related record including
      being a member of a project to which the particular process-related record is related,
      being a creator of the particular process related record,
      being a member of a group of users which includes the creator of the particular process-related record,
      being a user to whom the particular process-related record has been assigned, or
      being a user who belongs to an entity that is related to the particular process-related record; and
   the one or more permissions including
      a project permission that indicates that a user is permitted to view process-related records that are related to a project to which the user belongs,
      a group created permission that indicates that a user is permitted to view process-related records that were created by a user group to which the user belongs,
      a created permission that indicates that a user is permitted to view process-related records that were created by the user,
      an assigned permission that indicates that a user is permitted to view process-related record that are assigned to the user, or
      an entity permission for a user who belongs to an entity that is related to the process-related record.

2. The process control system set forth in claim 1 further comprising:
   a graphical user interface whereby an administrator of the process control system specifies the one or more permissions with which a particular user is related.

3. A configurable system that includes a processor and a data storage device accessible to the processor, the processor executing a relational database system that has tables stored in the storage device and the configurable system comprising:
   a relational database system having tables that relate
      a plurality of users of the configurable system to a group belonging to one of a plurality of group categories and
      relate the group category to a user-configurable field of a plurality of kinds of user-configurable fields and to a set of permissions, the set of permissions specifying independently whether a user who belongs to the group that belongs to the group category can
   insert a value into the user-configurable field or
      delete a value from the user-configurable field
      or edit the value in the user-configurable field,
   the configurable system permitting a user belonging to a group that belongs to a particular group category to insert a value into or delete a value from a particular user-configurable field that is related to the particular group category or edit the value of the particular user-configurable field as determined by the permission for the particular group category and particular user-configurable field and the plurality of kinds of user configurable fields including a kind in which
      the user-configurable field is permitted to have a single value,
      prior to insertion of the single value, the user-configurable field has a null value, and
      after deletion of the single value, the user-configurable field has a null value.

4. The configurable system set forth in claim 3 wherein the plurality of kinds of user-configurable fields further includes a kind in which:
   the value is an identifier that identifies an editable file; and
   the permissions do not permit the user to edit the file identified by the identifier.

5. The configurable system set forth in claim 4 wherein:
   the edit permission permits the user to edit the file identified by the identifier.

6. The configurable system set forth in claim 3 wherein:
   the plurality of kinds of user-configurable fields further includes a kind in which:
   the user-configurable field is permitted to have zero or more values;
   inserting a value adds a value to the user-configurable field; and
   deleting a value deletes a value from the user-configurable field.

7. The configurable system set forth in claim 3 further comprising:
   a graphical user interface whereby an administrator of the process control system sets one or more of the permissions for a group category and a user-configured field related to the group category.

* * * * *